United States Patent
Minamisawa et al.

(10) Patent No.: US 10,389,941 B2
(45) Date of Patent: Aug. 20, 2019

(54) OPTICAL UNIT WITH SHAKE CORRECTION FUNCTION AND GRAVITY CENTER ADJUSTING METHOD FOR SWING BODY IN OPTICAL UNIT WITH SHAKE CORRECTION FUNCTION

(71) Applicant: NIDEC SANKYO CORPORATION, Suwa-gun Nagano (JP)

(72) Inventors: Shinji Minamisawa, Suwa-gun Nagano (JP); Takeshi Sue, Suwa-gun Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/956,098

(22) Filed: Apr. 18, 2018

(65) Prior Publication Data
US 2018/0309931 A1    Oct. 25, 2018

(30) Foreign Application Priority Data
Apr. 21, 2017   (JP) .................................. 2017-084798

(51) Int. Cl.
| | | |
|---|---|---|
| G02B 7/02 | (2006.01) | |
| G02B 7/04 | (2006.01) | |
| H04N 5/225 | (2006.01) | |
| H04N 5/232 | (2006.01) | |

(52) U.S. Cl.
CPC ......... *H04N 5/23264* (2013.01); *G02B 7/023* (2013.01); *G02B 7/04* (2013.01); *H04N 5/2253* (2013.01); *H04N 5/2254* (2013.01)

(58) Field of Classification Search
CPC ........ G02B 7/023; G02B 7/04; G02B 27/644; G02B 27/646; G02B 27/648; H04N 5/2253; H04N 5/2254; H04N 5/23264; H04N 5/2257; H04N 5/23287; G03B 2205/0007; G03B 5/00
See application file for complete search history.

(56) References Cited

U.S. PATENT DOCUMENTS

| | | | | |
|---|---|---|---|---|
| 5,539,575 A | * | 7/1996 | Kakizawa ............ | G02B 27/646 359/554 |
| 5,637,861 A | * | 6/1997 | Okada .................. | H04N 3/1587 250/208.1 |

(Continued)

FOREIGN PATENT DOCUMENTS

JP          2015064501 A       4/2015

*Primary Examiner* — Chia Wei A Chen
(74) *Attorney, Agent, or Firm* — Cantor Colburn LLP

(57) ABSTRACT

An optical unit with a shake correction function may include a swing body which holds an optical element; a swing support mechanism structured to swingably support the swing body between a reference posture, where an axial line previously set and an optical axis are coincided with each other, and a tilted posture, where the optical axis is tilted with respect to the axial line; and a support body which supports the swing body through the swing support mechanism; and a weight which is used so that a swing center of the swing body and a gravity center of the swing body are coincided with each other in a direction of the axial line. The swing body may include a fixed region to which the weight is fixed. A fixed position of the weight may be changeable in the fixed region in a direction of the optical axis.

26 Claims, 20 Drawing Sheets

(56) References Cited

U.S. PATENT DOCUMENTS

| | | | | |
|---|---|---|---|---|
| 5,798,863 A * | 8/1998 | Udagawa | G02B 27/646 | |
| | | | 359/554 | |
| 2007/0236101 A1* | 10/2007 | Onozuka | H02N 2/025 | |
| | | | 310/323.01 | |
| 2010/0091120 A1* | 4/2010 | Nagata | G02B 27/646 | |
| | | | 348/208.4 | |
| 2011/0103782 A1* | 5/2011 | Tsuruta | G02B 7/022 | |
| | | | 396/55 | |
| 2013/0201392 A1* | 8/2013 | Gutierrez | G03B 3/10 | |
| | | | 348/374 | |
| 2014/0334809 A1* | 11/2014 | Chapman | G02B 27/646 | |
| | | | 396/55 | |
| 2015/0215542 A1* | 7/2015 | Nomura | H04N 5/23287 | |
| | | | 348/208.11 | |
| 2015/0309327 A1* | 10/2015 | Dobermann | G02B 23/18 | |
| | | | 359/407 | |
| 2016/0291344 A1* | 10/2016 | Terajima | H04M 1/0264 | |
| 2017/0118411 A1* | 4/2017 | Morinaga | H04N 5/23287 | |
| 2019/0018260 A1* | 1/2019 | Minamisawa | G02B 27/646 | |

* cited by examiner

OPTICAL UNIT WITH SHAKE CORRECTION FUNCTION AND GRAVITY CENTER ADJUSTING METHOD FOR SWING BODY IN OPTICAL UNIT WITH SHAKE CORRECTION FUNCTION

CROSS REFERENCE TO RELATED APPLICATION

The present invention claims priority under 35 U.S.C. § 119 to Japanese Application No. 2017-084798 filed Apr. 21, 2017, the entire content of which is incorporated herein by reference.

FIELD OF THE INVENTION

At least an embodiment of the present invention may relate to an optical unit with a shake correction function which is mounted on a portable terminal or a movement body. Further, at least an embodiment of the present invention may relate to a gravity center adjusting method for a swing body including an optical element in an optical unit with a shake correction function.

BACKGROUND

An optical unit which is mounted on a movement body such as a portable terminal, a vehicle or an unmanned helicopter may include a shake correction function structured to swing a swing body having an optical element to correct a shake in order to restrain disturbance of a photographed image due to the shake of the optical unit. An optical unit with a shake correction function described in Japanese Patent Laid-Open No. 2015-64501 includes a swing body having an optical element, a swing support mechanism structured to swingably support the swing body, a support body structured to support the swing body from an outer peripheral side through the swing support mechanism, and a magnetic swing drive mechanism structured to swing the swing body. The swing support mechanism includes a gimbal mechanism which is disposed between the swing body and the support body. The magnetic swing drive mechanism includes coils fixed to the swing body and magnets which are fixed to the support body so as to face the coils.

In an optical unit with a shake correction function, when a swing center (swing axial line) of a swing body by a swing support mechanism is not coincided with a gravity center of the swing body, a problem may occur such that the swing body resonates due to a shake from the outside. In order to prevent the problem, a weight is attached to the swing body to adjust its gravity center. When the gravity center is to be adjusted, first, a first weight is fixed to a swing body and the gravity center is roughly adjusted. After that, a second weight having a weight lighter than that of the first weight is fixed to the swing body to finely adjust the gravity center.

In this case, in a method that a gravity center is adjusted by using two weights whose weights are different from each other, a case may be occurred that adjustment of the gravity center is completed without using the second weight for a fine adjustment. In this case, the second weight for a fine adjustment is not used and thus the second weight is left as a stock

SUMMARY

In view of the problem described above, at least an embodiment of the present invention may advantageously provide an optical unit with a shake correction function which is capable of setting a swing center of the swing body by the swing support mechanism to coincide with a gravity center of the swing body by using one weight. Further, at least an embodiment of the present invention may advantageously provide a gravity center adjusting method by which a gravity center of the swing body is adjusted by using one weight.

According to at least an embodiment of the present invention, there may be provided an optical unit with a shake correction function including a swing body which holds an optical element, a swing support mechanism which swingably supports the swing body between a reference posture where an axial line previously set and an optical axis are coincided with each other and a tilted posture where the optical axis is tilted with respect to the axial line, a support body which supports the swing body through the swing support mechanism, and a weight which is used so that a swing center of the swing body and a gravity center of the swing body are coincided with each other in a direction of the axial line. The swing body includes a fixed region to which the weight is fixed, and a fixed position of the weight is capable of being changed in the fixed region in the direction of the optical axis.

In at least an embodiment of the present invention, a fixed position of the weight attached to the swing body is capable of being changed in the fixed region in the direction of the optical axis. Therefore, when one weight is to be attached to the optical module, the fixed position can be adjusted in the fixed region in the optical axis direction and, as a result, the gravity center can be adjusted in the optical axis direction.

In at least an embodiment of the present invention, the optical unit includes a position adjusting mechanism structured to move the fixed position in the fixed region, the swing body includes a tube part which is coaxial with an optical axis of the optical element, the fixed region is an outer peripheral face portion of the tube part which faces an outer side in a radial direction, the weight is formed in a ring shape and the tube part is inserted into a center hole of the weight, and the position adjusting mechanism includes a female screw part provided on an inner peripheral face of the weight and a male screw part which is provided in the fixed region and is threadedly engaged with the female screw. According to this structure, the female screw part of the weight and the male screw part of the tube part of the swing body are threadedly engaged with each other and, when the weight is turned, the weight can be moved in the optical axis direction and thus, the gravity center is easily adjusted. Further, according to this structure, the position of the weight in the optical axis direction can be finely adjusted.

In at least an embodiment of the present invention, the optical unit includes a position adjusting mechanism structured to move the fixed position in the fixed region, the swing body includes a tube part which is coaxial with an optical axis of the optical element, the fixed region is an outer peripheral face portion of the tube part which faces an outer side in a radial direction, and the weight is formed in a ring shape and the tube part is inserted into a center hole of the weight. In addition, the position adjusting mechanism includes a plurality of protruded parts provided in the fixed region at positions different in a circumferential direction and in the direction of the axial line, and an abutting part which is protruded from the weight in the direction of the axial line so as to be capable of abutting with each of the plurality of the protruded parts in the direction of the axial line. When the weight is turned around the axial line to change the protruded part abutted with the abutting part, a fixed position of the weight can be moved in the direction of the axial line. According to this structure, when the weight is turned around the axial line and the abutting part is selectively abutted with one of the plurality of protruded parts provided in the tube part, the weight can be moved in the optical axis direction. Therefore, the gravity center of the swing body is easily adjusted.

In at least an embodiment of the present invention, the weight is provided with an engaging part which is capable of engaging with a jig on a portion which is visually observed when viewed in the direction of the axial line. According to this structure, the jig is engaged with the weight in the axial line direction and the weight can be turned around the axial line.

In at least an embodiment of the present invention, in order to provide the fixed region for the weight in the swing body, the swing body includes a lens barrel part which holds the optical element on an inner peripheral side of the swing body, and the tube part is a part of the lens barrel part. Specifically, it may be structured that the swing body includes an optical module having the lens barrel part and a lens barrel holder which holds the optical module from an outer peripheral side, the optical module holds a circuit board on which an imaging element is mounted at an end part on an image side of the lens barrel part, the lens barrel holder is provided with an optical module holding part in a tube shape which holds the optical module from an outer peripheral side, an end part of the lens barrel part on an object side is protruded to the object side from the optical module holding part, and the male screw part is formed on an outer peripheral face of the lens barrel part which is protruded to the object side from the lens barrel holder. Further, in this case, it may be structured that the optical unit further includes a magnetic swing drive mechanism structured to swing the swing body, and a fixed body which supports the swing body through the support body. The lens barrel holder includes a bottom plate part which is provided with the optical module holding part at a center of the bottom plate part, and a plurality of wall parts which are formed so as to stand up in the direction of the optical axis from an outer peripheral side of the bottom plate part. The fixed body includes a case in a tube shape provided with a plurality of side plates facing the plurality of the wall parts from an outer peripheral side, and the magnetic swing drive mechanism is structured between the plurality of the wall parts of the lens barrel holder and the plurality of the side plates of the case.

In at least an embodiment of the present invention, the swing body includes a lens barrel part which holds the optical element on an inner peripheral side of the lens barrel part and a lens barrel holder having a holding part in a tube shape which holds the lens barrel part from an outer peripheral side, and the tube part is a part of the holding part. According to this structure, the fixed region for the weight is provided in the holding part located on a further outer peripheral side with respect to the lens barrel part which holds the optical element on its inner peripheral side. As a result, the weight is enlarged in a radial direction and thus, resin or metal whose specific gravity is relatively small can be used for securing a weight of the weight.

In at least an embodiment of the present invention, the optical unit includes a magnetic swing drive mechanism structured to swing the swing body, and a fixed body which supports the swing body through the support body for swinging the swing body, and the magnetic swing drive mechanism includes a coil fixed to one of the swing body and the fixed body and a magnet fixed to the other of the swing body and the fixed body so as to face the coil in the radial direction, and the magnet is polarized and magnetized in two pieces in the direction of the axial line.

In at least an embodiment of the present invention, the magnetic swing drive mechanism includes a Hall element which is attached to the one of the swing body and the support body where the coil is fixed so as to face the magnet. According to this structure, it can be detected that the swing body is set in the reference posture based on an output of the Hall element. Further, according to this structure, a tilt angle that the swing body is tilted with respect to the axial line can be detected based on an output of the Hall element.

According to at least an embodiment of the present invention, there may be provided a gravity center adjusting method for the swing body in the above-mentioned optical unit with a shake correction function, the gravity center adjusting method including previously providing a gimbal mechanism as the swing support mechanism, previously attaching a Hall element to the one of the swing body and the fixed body where the coil is fixed at a position facing a magnetizing polarized line of the magnet when the swing body is set in the reference posture, attaching the weight in the fixed region and, while monitoring an output of the Hall element, an external force applying operation in which an external force in a direction perpendicular to the axial line is applied to the optical unit and a moving operation in which the weight is moved in the fixed region are alternately repeated, and fixing the weight at a position where the output of the Hall element becomes smaller than a predetermined threshold value.

According to at least an embodiment of the present invention, a gravity center of the swing body can be adjusted by utilizing an output of the Hall element when an external force perpendicular to the axial line is applied. In other words, in a state that a swing center (swing axis) by the swing support mechanism and a gravity center of the swing body are coincided with each other, a swing of the swing body is restrained when an external force is applied. Therefore, in a state that a swing center (swing axis) by the swing support mechanism and a gravity center of the swing body are coincided with each other, an output (amplitude) of the Hall element becomes small when an external force perpendicular to the axial line is applied. Accordingly, in a case that an external force is applied while changing a position of the weight, when the weight is fixed at a position where an output of the Hall element becomes smaller than a predetermined threshold value, the swing center by the swing support mechanism and the gravity center of the swing body can be coincided with each other.

Further, according to at least an embodiment of the present invention, there may be provided a gravity center adjusting method for the swing body in the above-mentioned optical unit with a shake correction function, the gravity center adjusting method including previously providing a gimbal mechanism as the swing support mechanism, attaching the weight in the fixed region and, while monitoring a tilt angle of the swing body with respect to the axial line, an external force applying operation in which an external force in a direction perpendicular to the axial line is applied to the optical unit and a moving operation in which the weight is moved in the fixed region are alternately repeated, and fixing the weight at a position where the tilt angle with respect to the axial line becomes smaller than a predetermined angle.

In at least an embodiment of the present invention, a gravity center of the swing body is adjusted by detecting a tilt angle of the swing body when an external force perpendicular to the axial line is applied. In other words, in a state that a swing center (swing axis) by the swing support mechanism and a gravity center of the swing body are coincided with each other, a swing of the swing body is restrained when an external force is applied. Therefore, in a state that a swing center (swing axis) by the swing support mechanism and a gravity center of the swing body are coincided with each other, an angle of the swing body tilted with respect to the axial line becomes small when an external force perpendicular to the axial line is applied. Accordingly, in a case that an external force is applied while changing a position of the weight, when the weight is fixed at a position where a tilt angle of the swing body with respect to the axial line becomes smaller than a predetermined angle, the swing center by the swing support mechanism and the gravity center of the swing body can be coincided with each other.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of an optical unit with a shake correction function to which the present invention is applied will be described below with reference to the accompanying drawings. In this specification, three axes "X", "Y" and "Z" are directions perpendicular to each other. One side in the "X"-axis direction is indicated as "+X", the other side is indicated as "−X", one side in the "Y"-axis direction is indicated as "+Y", the other side is indicated as "−Y", one side in the "Z"-axis direction is indicated as "+Z", and the other side is indicated as "−Z". The "Z"-axis direction is an axial line direction of the optical unit and is an optical axis direction of an optical element. The "+Z" direction is an object side of the optical unit and the "−Z" direction is an anti-object side (image side) of the optical unit.

(Entire Structure)

Figure 1:
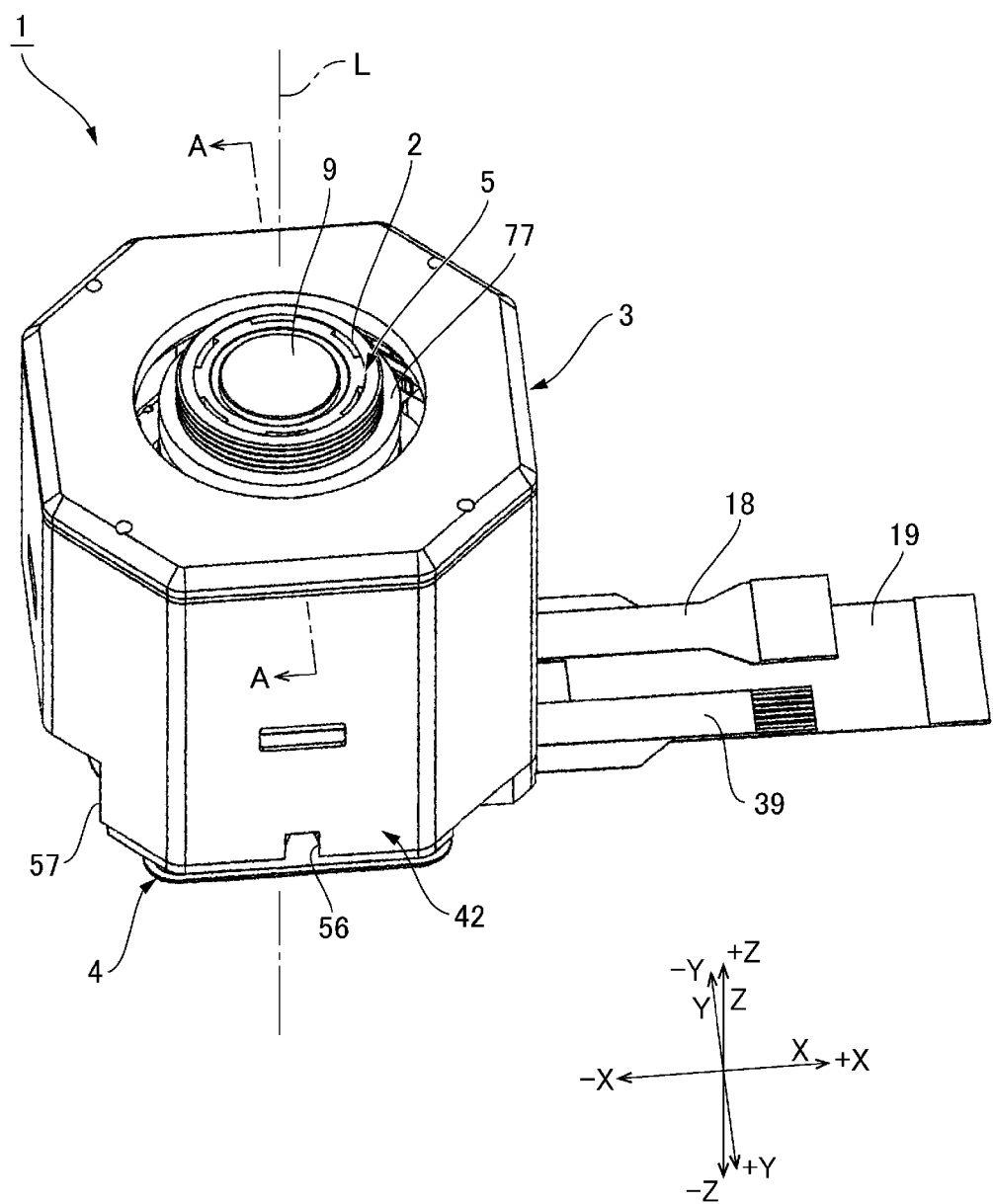
FIG. 1 is a perspective view showing an optical unit in accordance with an embodiment of the present invention which is viewed from an object side.
Figure 2:
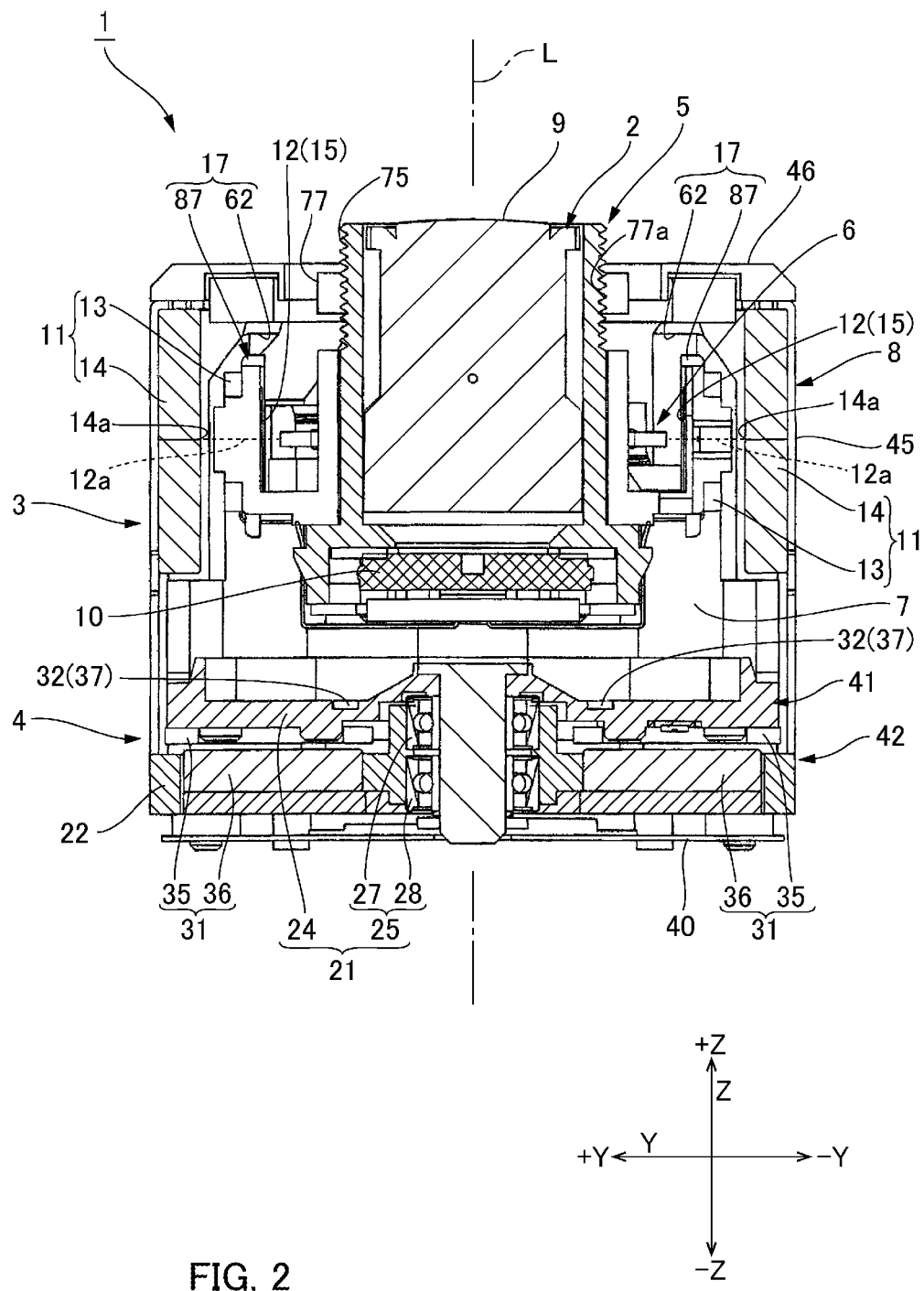
FIG. 2 is a cross-sectional view showing the optical unit which is cut by the "A-A" line in FIG. 1.
Figure 3:
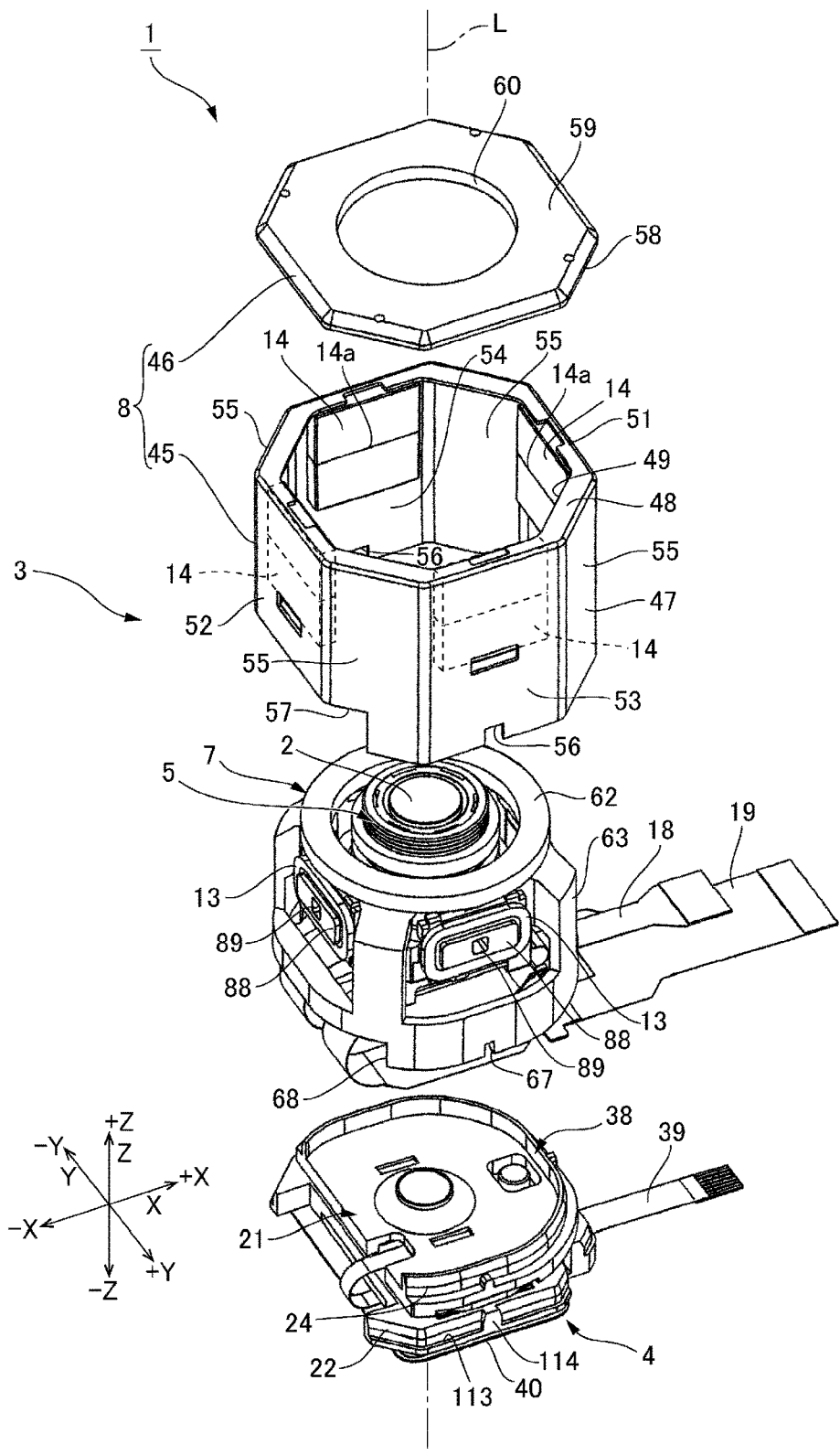
FIG. 3 is an exploded perspective view showing the optical unit in FIG. 1 which is viewed from an object side.

FIG. 1 is a perspective view showing an optical unit in accordance with an embodiment of the present invention which is viewed from an object side. FIG. 2 is a cross-sectional view showing the optical unit which is cut by the "A-A" line in FIG. 1. FIG. 3 is an exploded perspective view showing the optical unit in FIG. 1 which is viewed from an object side. An optical unit 1 shown in FIG. 1 is, for example, used in an optical device such as a cell phone with a camera and a drive recorder or in an optical device such as an action camera mounted on a helmet, a bicycle, a radio-controlled helicopter and the like or a wearable camera. In the optical device, when a shake is occurred in the optical device at the time of photographing, disturbance of a photographed image is generated. The optical unit 1 in this embodiment is an optical unit with a shake correction function structured to correct a tilt and a turning of an optical module 2 which is mounted for avoiding disturbance of a photographed image.

As shown in FIGS. 2 and 3, the optical unit 1 includes a first unit 3 having an optical module 2 and a second unit 4 which turnably supports the first unit 3 from the "−Z" direction side.

As shown in FIG. 2, the first unit 3 includes a movable unit (swing body) 5 having an optical module 2, a swing support mechanism 6 which swingably supports the movable unit 5, a holder 7 (support body) which supports the movable unit 5 through the swing support mechanism 6, and a case body 8 which surrounds the movable unit 5 and the holder 7 from an outer peripheral side. The optical module 2 includes an optical element 9 and an imaging element 10 disposed on an optical axis of the optical element 9. The swing support mechanism 6 swingably supports the movable unit 5 between a reference posture where a predetermined axial line "L" and an optical axis of the optical element 9 are coincided with each other and a tilted posture where the optical axis is tilted with respect to the axial line "L". The swing support mechanism 6 is a gimbal mechanism. In this embodiment, the axial line "L" is coincided with the "Z"-axis.

The first unit 3 includes a magnetic swing drive mechanism 11 structured to swing the movable unit 5 and a posture return mechanism 12 structured to return the swung movable unit 5 to the reference posture. The magnetic swing drive mechanism 11 includes swing drive coils 13 which are held by the movable unit 5 and swing drive magnets 14 which are held by the case body 8. The swing drive coil 13 and the swing drive magnet 14 are faced each other in a radial direction perpendicular to the axial line "L". The posture return mechanism 12 includes posture return magnetic members 15 which are held by the movable unit 5 and face the swing drive magnets 14.

In addition, the first unit 3 includes a swing stopper mechanism 17 structured to restrict a swing range of the movable unit 5. Further, the first unit 3 includes a flexible printed circuit board 18 electrically connected with the swing drive coils 13 and a flexible printed circuit board 19 electrically connected with the imaging element 10.

Next, the second unit 4 includes a turnable support mechanism 21 which turnably supports the holder 7 around the axial line "L", and a fixing member 22 which supports the holder 7 through the turnable support mechanism 21. The turnable support mechanism 21 includes a turnable pedestal 24 and a bearing mechanism 25. The turnable pedestal 24 is turnably supported by the fixing member 22 through the bearing mechanism 25. The bearing mechanism 25 includes a first ball bearing 27 and a second ball bearing 28 which are arranged in the "Z"-axis direction. The first ball bearing 27 is located on the "+Z" direction side with respect to the second ball bearing 28.

The second unit 4 includes a magnetic rolling drive mechanism 31 structured to turn the turnable pedestal 24 and an angular position return mechanism 32 structured to return the turnable pedestal 24 having been turned to a predetermined reference angular position. The magnetic rolling drive mechanism 31 includes rolling drive coils 35 held by the turnable pedestal 24 and rolling drive magnets 36 held by the fixing member 22. The rolling drive coil 35 and the rolling drive magnet 36 are faced each other in the "Z"-axis direction. The angular position return mechanism 32 includes angular position return magnetic members 37 which are fixed to the turnable pedestal 24. The angular position return magnetic member 37 is overlapped with the rolling drive magnet 36 when viewed in the "Z"-axis direction. In addition, the second unit 4 includes a turning stopper mechanism 38 (turning angle range restriction mechanism) structured to restrict a turnable angular range of the turnable pedestal 24. Further, the second unit 4 includes a flexible printed circuit board 39 electrically connected with the rolling drive coils 35 and a cover member 40 which is fixed to the fixing member 22.

In this embodiment, the holder 7 of the first unit 3 is attached to the turnable pedestal 24. Therefore, when the turnable pedestal 24 is turned, the movable unit 5 and the holder 7 of the first unit 3 are turned around the "Z"-axis (around the axial line "L") together with the turnable pedestal 24. Accordingly, the movable unit 5 and the holder 7 of the first unit 3 and the turnable pedestal 24 of the second unit 4 structure the movable body 41 which is integrally turned around the "Z"-axis. On the other hand, the case body 8 of the first unit 3 is attached to the fixing member 22. Therefore, the fixing member 22 and the case body 8 structure a fixed body 42 which turnably supports the movable body 41. The turnable pedestal 24 structures the turnable support mechanism 21 and, in addition, structures the movable body 41.

(First Unit)

As shown in FIG. 3, the case body 8 includes a tube-shaped case 45 formed in a substantially octagonal outward shape when viewed in the "Z"-axis direction, and an object side case 46 which is assembled to the tube-shaped case 45 from the "+Z" direction side (object side). The tube-shaped case 45 is formed of magnetic material. The object side case 46 is formed of resin material.

The tube-shaped case 45 is provided with a body part 47 in a substantially octagonal tube shape and an end plate part 48 in a frame shape which is projected to an inner side from an end part in the "+Z" direction of the body part 47. An opening part 49 in a substantially octagonal shape is formed at a center of the end plate part 48. The body part 47 is provided with side plates 51 and 52 facing each other in the "X"-axis direction, side plates 53 and 54 facing each other in the "Y"-axis direction, and side plates 55 which are provided at four corner parts so as to be inclined by 45 degrees with respect to the "X"-axis direction and the "Y"-axis direction. A swing drive magnet 14 is fixed to each of inner peripheral faces of the side plates 51 and 52 facing the "X"-axis direction and the side plates 53 and 54 facing the "Y"-axis direction. Each of the swing drive magnets 14 is polarized and magnetized in the "Z"-axis direction. A magnetizing polarized line 14a of each of the swing drive magnets 14 is extended in a circumferential direction in a direction perpendicular to the "Z"-axis (axial line "L").

The tube-shaped case 45 is provided with a positioning cut-out part 56 in each of a lower end edge portion in the "+X" direction, a lower end edge portion in the "+Y" direction, and a lower end edge portion in the "−Y" direction. Further, the body part 47 is provided with a rectangular cut-out part 57 for extending the flexible printed circuit boards 18 and 19 in a lower end edge portion in the "−X" direction.

The object side case 46 is provided with a body part 58 in a tube shape which is abutted with the end plate part 48 of the tube-shaped case 45 and an end plate part 59 which is projected to an inner side from an end part in the "+Z" direction of the body part 58. A circular opening part 60 is formed at a center of the end plate part 59. An end portion in the "+Z" direction of an optical module 2 is inserted into the circular opening part 60.

(Holder)

Figure 4:
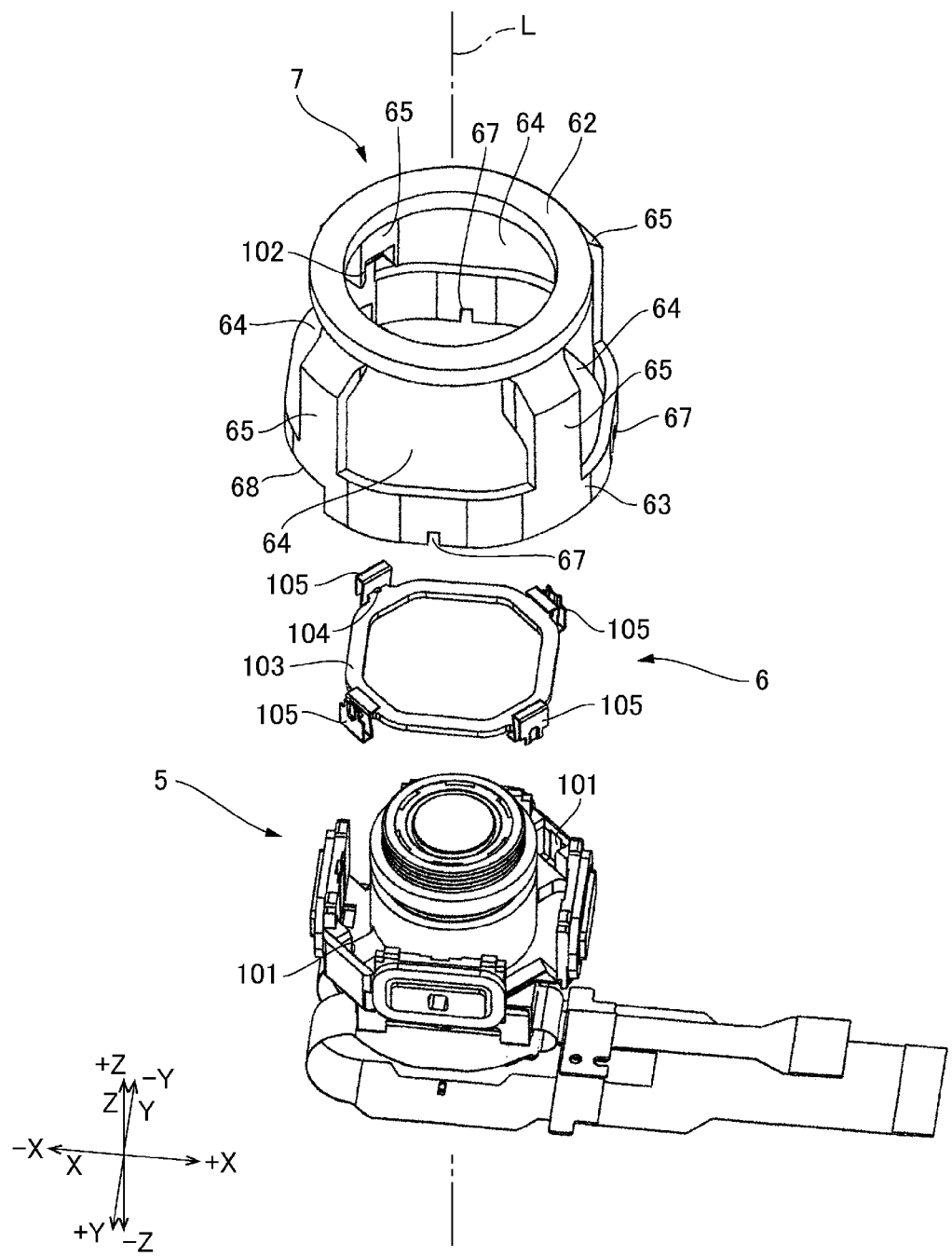
FIG. 4 is an exploded perspective view showing a first unit which is viewed from an object side.
Figure 5:
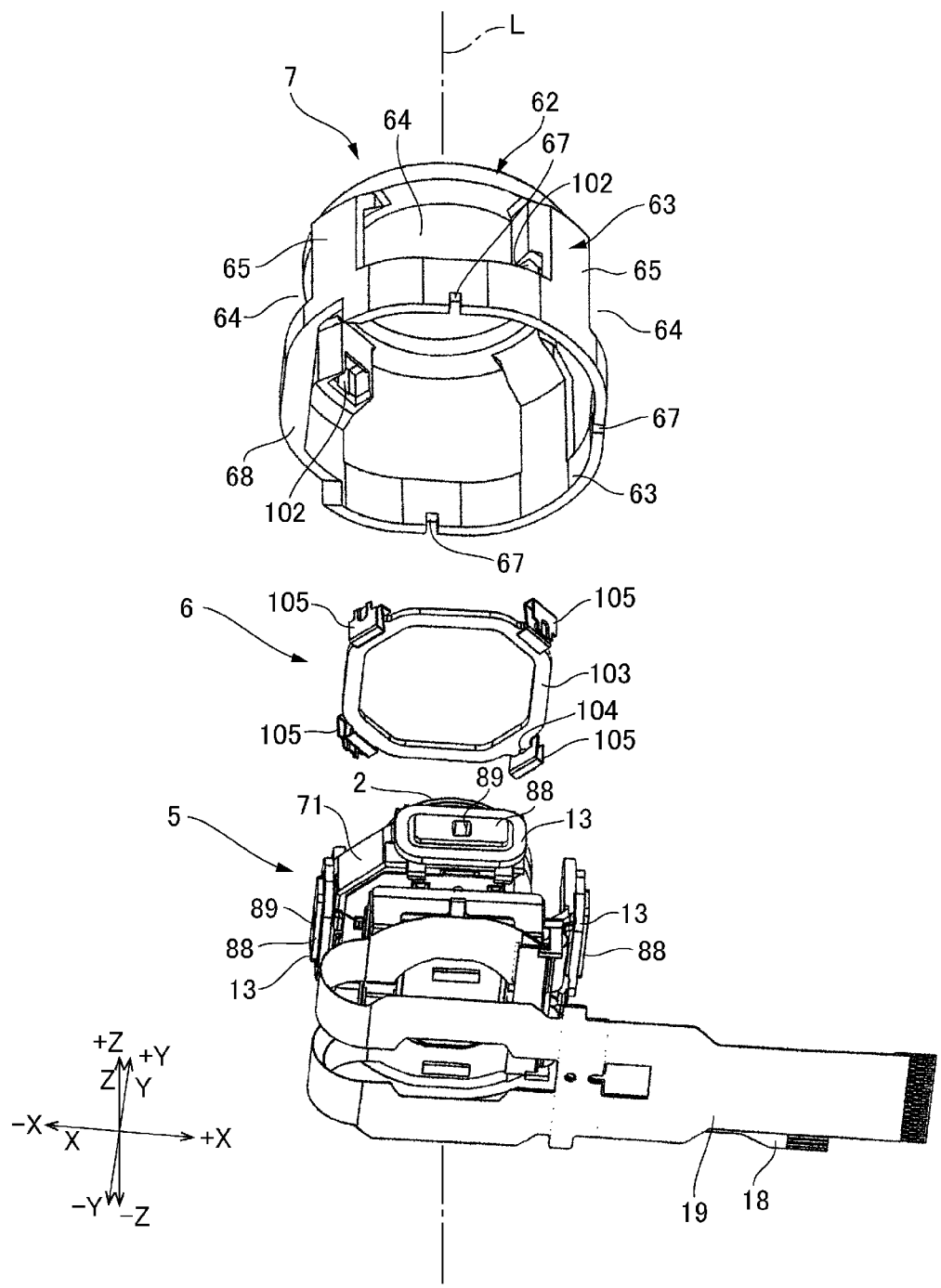
FIG. 5 is an exploded perspective view showing the first unit which is viewed from an anti-object side.

FIG. 4 is an exploded perspective view showing the movable unit 5 and the holder 7 which are viewed from the "+Z" direction side. FIG. 5 is an exploded perspective view showing the movable unit 5 and the holder 7 which are viewed from the "−Z" direction side. As shown in FIG. 4, the holder 7 is provided with a holder ring-shaped part 62 into which an end portion in the "+Z" direction of the movable unit 5 is inserted, and a holder body part 63 which is continuously formed on the "−Z" direction side from the holder ring-shaped part 62. The holder body part 63 is provided with four window parts 64 arranged in the circumferential direction and four vertical frame parts 65 which section adjacent window parts 64 in the circumferential direction. Two of the four window parts 64 are opened in the "X"-axis direction, and the other two are opened in the "Y"-axis direction. Four vertical frame parts 65 are respectively disposed at angular positions between the "X"-axis direction and the "Y"-axis direction.

The holder body part 63 is provided with a positioning cut-out part 67 in each of a lower end edge portion in the "+X" direction, a lower end edge portion in the "+Y" direction, and in a lower end edge portion in the "−Y" direction. Further, the holder body part 63 is provided with a rectangular cut-out part 68 for extending the flexible printed circuit boards 18 and 19 in a lower end edge portion in the "−X" direction.

(Movable Unit)

Figure 6:
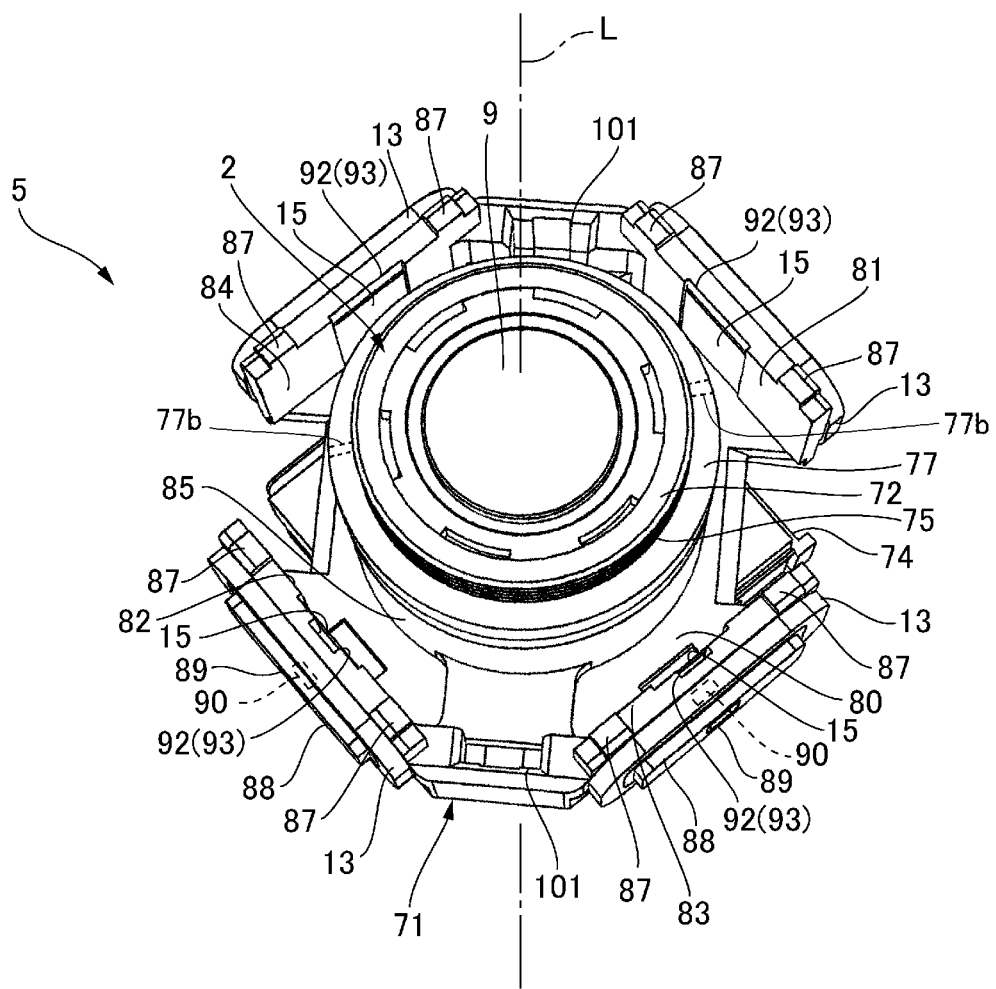
FIG. 6 is a perspective view showing a movable body which is viewed from an object side.
Figure 6:
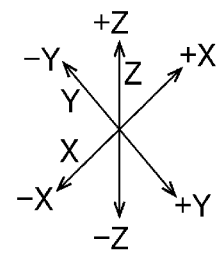
Figure 7A:
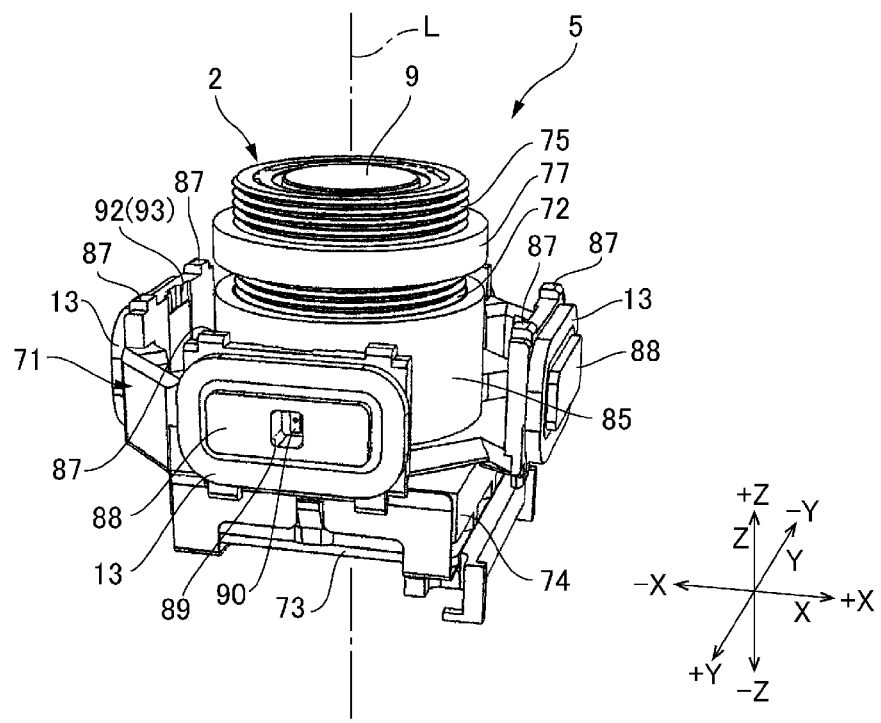
FIGS. 7A and 7B are perspective views showing the movable body which are viewed from an object side and an anti-object side.
Figure 7B:
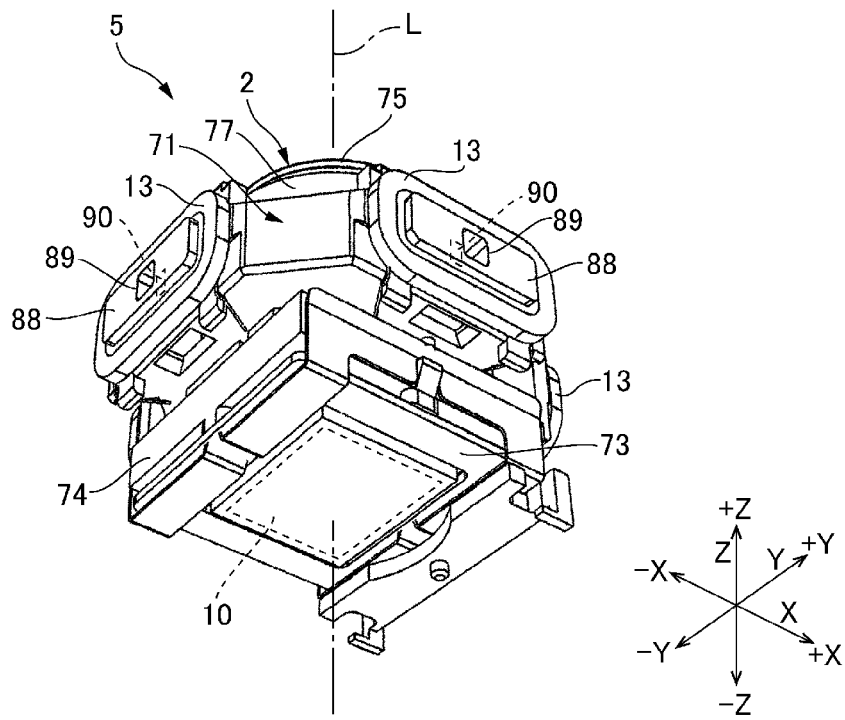

FIG. 6 is a perspective view showing the movable unit (swing body) 5 which is viewed from the "+Z" direction side (object side). FIG. 7A is a perspective view showing the movable unit 5 which is viewed from the "+Z" direction side (object side) and FIG. 7B is a perspective view showing the movable unit 5 which is viewed from the "−Z" direction. As shown in FIG. 6 and FIGS. 7A and 7B, the movable unit 5 includes the optical module 2 and an optical module holder 71 (lens barrel holder) which holds the optical module 2 from an outer peripheral side. The optical module 2 includes a lens barrel part 72 which holds the optical element 9 on its inner peripheral side, and a rectangular tube part 74 which holds a circuit board 73 on its inner peripheral side in an end portion in the "−Z" direction (image side) of the lens barrel part 72. The imaging element 10 is mounted on the circuit board 73. A male screw part 75 is provided on an outer peripheral face of an end part in the "+Z" direction of the lens barrel part 72 (tube part) in a region over a predetermined width in the "Z"-axis direction (outer peripheral face portion) from an end face in the "+Z" direction.

A weight 77 for adjusting a gravity center position of the movable unit 5 is attached to the male screw part 75. The weight 77 is formed in a ring shape and is provided on its inner peripheral face with a female screw part 77a which is capable of being threadedly engaged with the male screw part 75. In this embodiment, the male screw part 75 corresponds to a fixed region to which the weight 77 is to be fixed. When the weight 77 is fitted from the end face in the "+Z" direction of the lens barrel part 72 and is turned around the "Z"-axis, a position of the weight 77 is moved in the "Z"-axis direction in the fixed region and thus a gravity center position of the movable unit 5 can be adjusted in the "Z"-axis direction. The male screw part 75 and the female screw part 77a structure a position adjusting mechanism 78 structured to move the fixed position of the weight 77 which is to be fixed to the movable unit 5 in the axial line direction.

As shown in FIG. 6, the optical module holder 71 is provided with a bottom plate part 80 in a substantially octagonal shape when viewed in the "Z"-axis direction, a pair of wall parts 81 and 82 which are stood up in the "+Z" direction and extended in the "Y"-axis direction at both ends in the "X"-axis direction of the bottom plate part 80, and a pair of wall parts 83 and 84 which are stood up in the "+Z" direction and extended in the "X"-axis direction at both ends in the "Y"-axis direction of the bottom plate part 80. Further, the optical module holder 71 is provided with an optical module holding part 85 (holding part) which is provided at a center of the bottom plate part 80. The optical module holding part 85 is formed in a tube shape and is coaxial with the axial line "L". The lens barrel part 72 of the optical module 2 is inserted into the optical module holding part 85. The optical module holding part 85 holds the lens barrel part 72 from an outer peripheral side. An end face in the "+Z" direction of each of the wall parts 81, 82, 83 and 84 is provided with two swing stopper protruded parts 87 which are protruded to the "+Z" direction. The two swing stopper protruded parts 87 are respectively protruded from both end portions in the circumferential direction of each of the wall parts 81, 82, 83 and 84.

A coil fixed part 88 is provided on an outer side face facing an outer side in the radial direction of each of the wall parts 81, 82, 83 and 84. A swing drive coil 13 is fixed to the coil fixed part 88 in a posture that its center hole is directed to an outer side in the radial direction. Further, a Hall element fixed part 89 is provided in the coil fixed parts 88 of the wall part 82 located on the "−X" direction side and the wall part 83 located on the "+Y" direction side. A Hall element 90 is fixed to the Hall element fixed part 89. The Hall element 90 is located at a center of the swing drive coil 13 in the "Z"-axis direction. The Hall element 90 is electrically connected with the flexible printed circuit board 18.

An inner side face facing an inner side in the radial direction of each of the wall parts 81, 82, 83 and 84 is provided with a magnetic member fixed region 92 for fixing a posture return magnetic member 15. The magnetic member fixed region 92 is a groove 93 which is extended in the "Z"-axis direction on an inner side face with a constant width. The posture return magnetic member 15 is formed in a rectangular plate shape and its dimension in the "Z"-axis direction is longer than its dimension in the circumferential direction. Further, the dimension in the "Z"-axis direction of the posture return magnetic member 15 is shorter than a dimension in the "Z"-axis direction of the groove 93. The posture return magnetic member 15 is fixed in the groove 93 in a posture that its longitudinal direction is directed in the "Z"-axis direction. In this embodiment, the posture return magnetic member 15 is fixed to an inside of the groove 93 with an adhesive after its fixed position in the groove 93 is adjusted in the "Z" direction so that the center of the posture return magnetic member 15 is overlapped with the magnetizing polarized line 14a of the swing drive magnet 14 when the movable unit 5 set in the reference posture state is viewed in the radial direction.

(Swing Support Mechanism)

Figure 8:
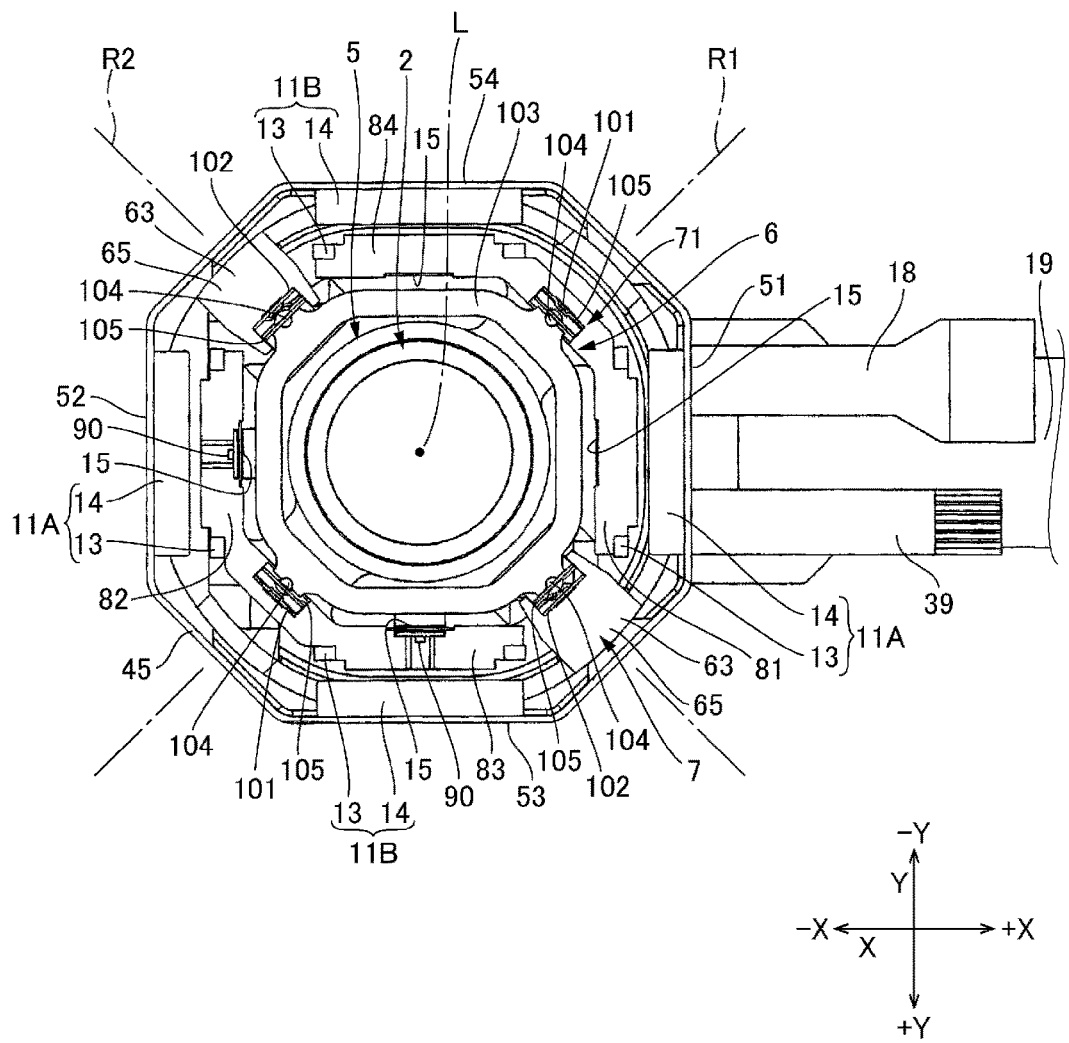
FIG. 8 is a cross-sectional view showing the optical unit which is cut by a plane perpendicular to an axial line.

FIG. 8 is a cross-sectional view showing the optical unit 1 which is cut by a plane perpendicular to the "Z"-axis (axial line "L") and passing the swing support mechanism 6. The swing support mechanism 6 is structured between the optical module holder 71 and the holder 7. As shown in FIG. 8, the swing support mechanism 6 includes two first swing support parts 101 provided at diagonal positions on a first axis "R1" of the optical module holder 71, two second swing support parts 102 provided at diagonal positions on a second axis "R2" of the holder body part 63, and a movable frame 103 which is supported by the first swing support parts 101 and the second swing support parts 102. In this embodiment, the first axis "R1" and the second axis "R2" are perpendicular to the "Z"-axis direction and are, in addition, inclined by 45 degrees with respect to the "X"-axis direction and the "Y"-axis direction. Therefore, the first swing support parts 101 and the second swing support parts 102 are disposed at angular positions between the "X"-axis direction and the "Y"-axis direction. As shown in FIGS. 4 and 5, the second swing support part 102 is a recessed part which is formed on an inner side face of the holder body part 63.

As shown in FIG. 8, the movable frame 103 is a plate-shaped spring whose planar shape viewed in the "Z"-axis direction is a substantially octagonal shape. A metal spherical body 104 is fixed to an outer side face of the movable frame 103 at four positions around the "Z"-axis by welding or the like. The spherical body 104 is in point contact with a point contact spring 105 which is held by the first swing support part 101 provided in the optical module holder 71, and is in point contact with a point contact spring 105 which is held by the second swing support part 102 provided in the holder body part 63. As shown in FIGS. 4 and 5, the point contact spring 105 is a plate-shaped spring. The point contact spring 105 held by the first swing support part 101 is capable of being elastically deformed in the first axis "R1" direction, and the point contact spring 105 held by the second swing support part 102 is capable of being elastically deformed in the second axis "R2" direction. Therefore, the movable frame 103 is supported in a turnable state around the respective directions, i.e., two directions perpendicular to the "Z"-axis direction (the first axis "R1" direction and the second axis "R2" direction).

(Magnetic Swing Drive Mechanism)

The magnetic swing drive mechanism 11 includes, as shown in FIG. 8, a first magnetic swing drive mechanism 11A and a second magnetic swing drive mechanism 11B which are provided between the movable unit 5 and the tube-shaped case 45. The first magnetic swing drive mechanism 11A includes two pairs of the swing drive magnets 14 and the swing drive coils 13 facing each other in the "X"-axis direction. Further, the first magnetic swing drive mechanism 11A includes the Hall element 90 which is disposed on an inner side of the swing drive coil 13 on the "−X" direction side. The second magnetic swing drive mechanism 11B includes two pairs of the swing drive magnets 14 and the swing drive coils 13 facing each other in the "Y"-axis direction.

Further, the second magnetic swing drive mechanism 11B includes the Hall element 90 which is disposed on an inner side of the swing drive coil 13 on the "+Y" direction side.

The respective swing drive coils 13 are held by outer side faces of the wall parts 81 and 82 on both sides in the "X"-axis direction of the optical module holder 71 and by outer side faces of the wall parts 83 and 84 on both sides in the "Y"-axis direction. The swing drive magnet 14 is held by an inner side face of each of the side plates 51, 52, 53 and 54 provided in the tube-shaped case 45. Each of the swing drive magnets 14 is divided into two pieces in the "Z"-axis direction as shown in FIGS. 2 and 3 and magnetic poles on the inner face side are magnetized so as to be different from each other with the magnetizing polarized line 14a as a boundary. Long side portions on the "+Z" direction side and the "−Z" direction side of the swing drive coil 13 are utilized as effective sides. When the movable unit 5 is set in the reference posture, each of the Hall elements 90 faces the magnetizing polarized line 14a of the swing drive magnet 14 located on its outer peripheral side. In this embodiment, the tube-shaped case 45 is structured of magnetic material and thus the tube-shaped case 45 functions as a yoke for the swing drive magnets 14.

Wiring lines of two pairs of the second magnetic swing drive mechanisms 11B which are located on the "+Y" direction side and the "−Y" direction side of the movable unit 5 are electrically connected so that magnetic-drive forces of the same direction around the "X"-axis are generated at the time of energization to the swing drive coils 13. Further, wiring lines of two pairs of the first magnetic swing drive mechanisms 11A which are located on the "+X" direction side and the "−X" direction side of the movable unit 5 are electrically connected so that magnetic-drive forces of the same direction around the "Y"-axis are generated at the time of energization to the swing drive coils 13. The magnetic swing drive mechanism 11 turns the optical module 2 around the first axis "R1" and around the second axis "R2" by combining turning around the "X"-axis by the second magnetic swing drive mechanism 11B and turning around the "Y"-axis by the first magnetic swing drive mechanism 11A. When a shake correction around the "X"-axis and a shake correction around the "Y"-axis are to be performed, turning around the first axis "R1" and turning around the second axis "R2" are combined.

(Swing Stopper Mechanism)

As shown in FIG. 2, the swing stopper mechanism 17 structured to restrict a swing range of the movable unit 5 is structured of the swing stopper protruded parts 87 provided in the movable unit 5 (optical module holder 71) and the holder ring-shaped part 62. When the movable unit 5 is going to become a tilted posture by exceeding a predetermined swing range, the swing stopper protruded part 87 is abutted with the holder ring-shaped part 62 to restrict a further tilt of the movable unit 5. Further, in the swing stopper mechanism 17, when the movable unit 5 is moved to the "+Z" direction by an external force, the swing stopper protruded part 87 is abutted with the holder ring-shaped part 62 to prevent the movable unit 5 from being moved to the "+Z" direction more.

(Posture Return Mechanism)

A posture return mechanism 12 includes the posture return magnetic members 15 and the swing drive magnets 14. As shown in FIG. 2, the posture return magnetic member 15 is disposed on an opposite side to the swing drive magnet 14 in the radial direction interposing the swing drive coil 13 therebetween. When the holder 7 in the reference posture state is viewed in the radial direction, a center of the posture return magnetic member 15 is located at a position overlapping with the magnetizing polarized line 14a of the swing drive magnet 14 located on its outer peripheral side. In other words, in a state that the movable unit 5 is set in the reference posture, an imaginary face 12a perpendicular to the axial line "L" including the magnetizing polarized line 14a passes the center of the posture return magnetic member 15.

In this embodiment, when the movable unit 5 is tilted from the reference posture (when the optical axis of the optical module 2 is tilted with respect to the axial line "L"), the center of the posture return magnetic member 15 is displaced from the magnetizing polarized line 14a of the swing drive magnet 14 in the "Z"-axis direction. As a result, a magnetic attraction force is acted between the posture return magnetic member 15 and the swing drive magnet 14 in a direction so that the center of the posture return magnetic member 15 is going toward a side where the magnetizing polarized line 14a of the swing drive magnet 14 is located. In other words, when the movable unit 5 is tilted from the reference posture, a magnetic attraction force is acted between the posture return magnetic member 15 and the swing drive magnet 14 in a direction returning the movable unit 5 to the reference posture. Therefore, the posture return magnetic member 15 and the swing drive magnet 14 function as the posture return mechanism structured to return the movable unit 5 to the reference posture.

(Second Unit)

Figure 9A:
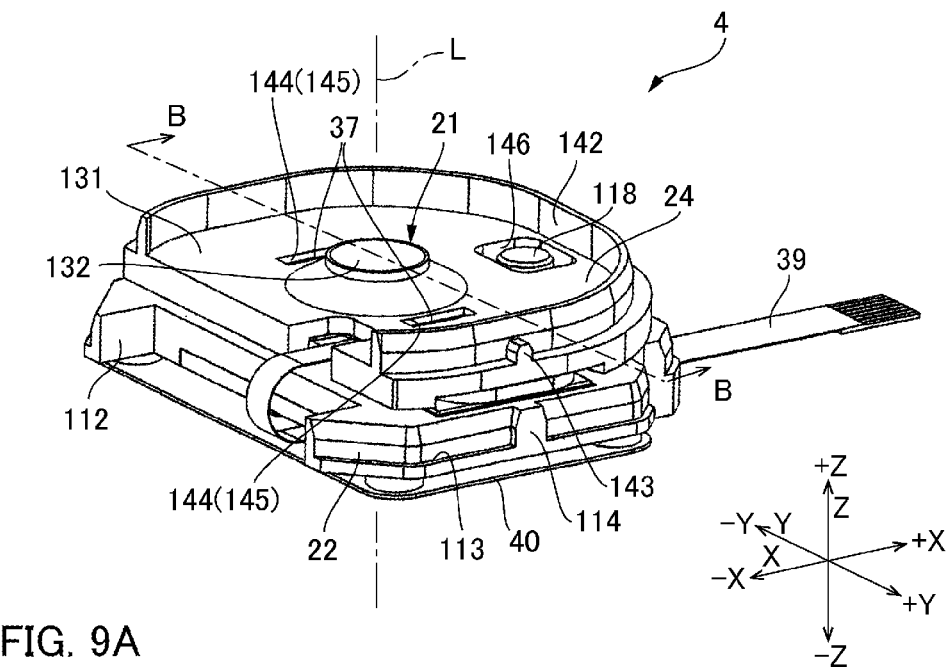
FIGS. 9A and 9B are perspective views showing a second unit which are viewed from an object side and an anti-object side.
Figure 9B:
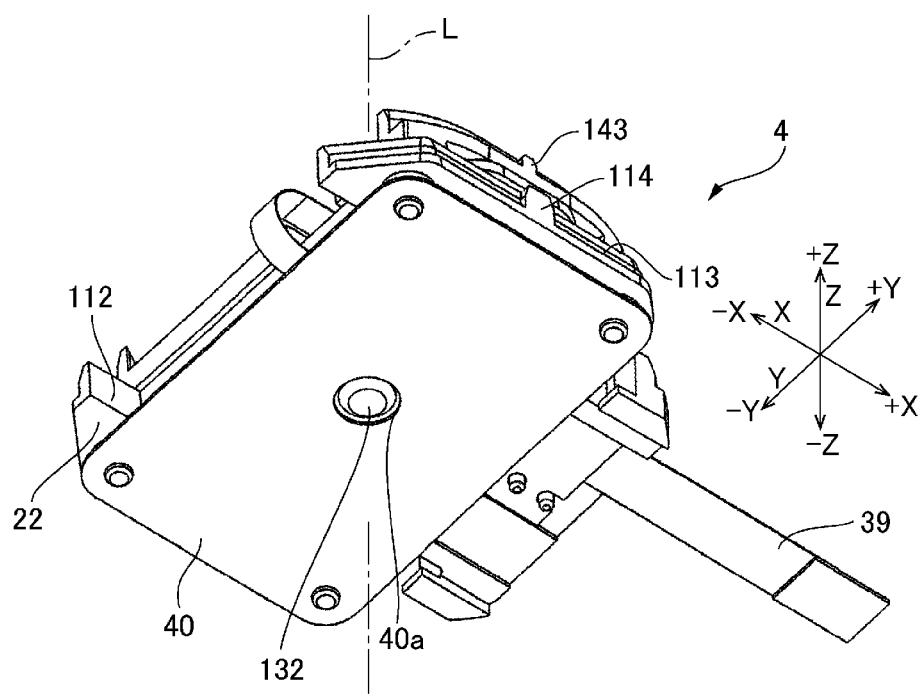
Figure 10:
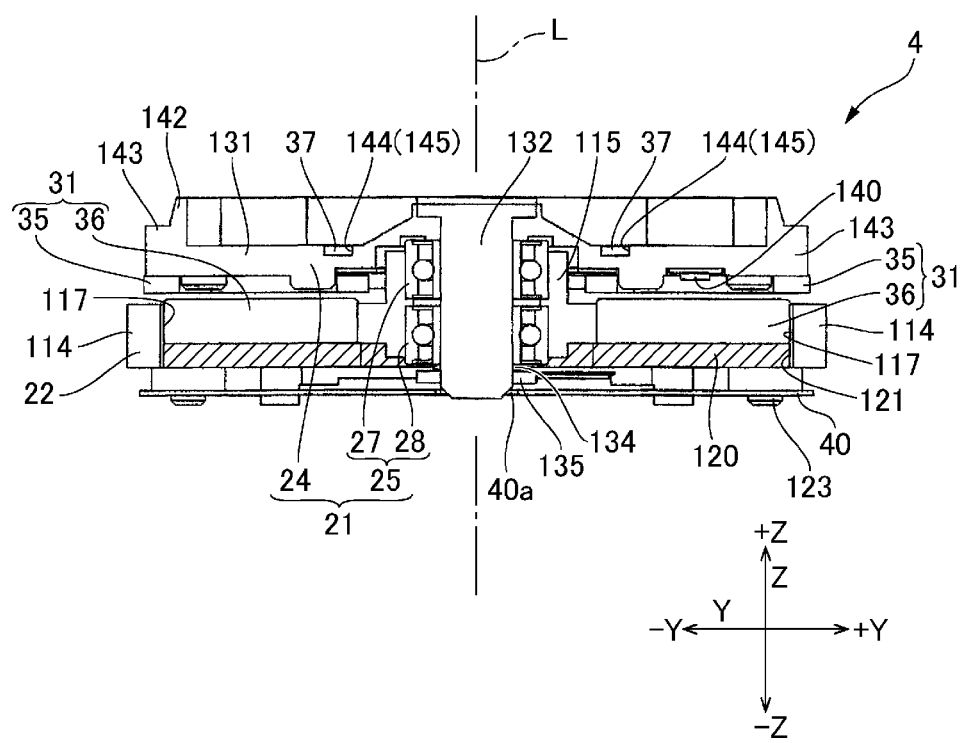
FIG. 10 is a cross-sectional view showing the second unit which is cut by the "B-B" line in FIG. 9A.
Figure 11:
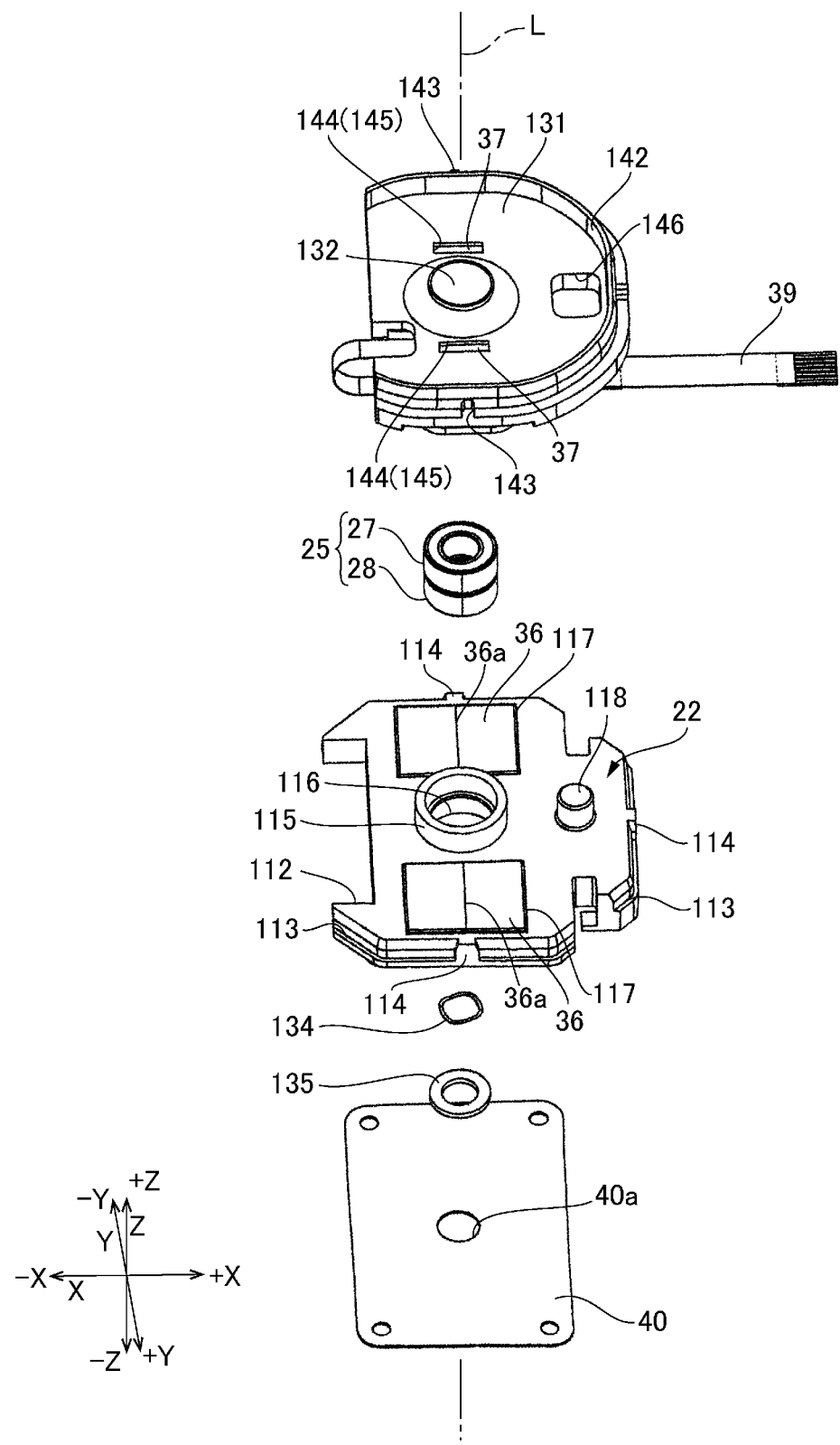
FIG. 11 is an exploded perspective view showing the second unit which is viewed from an object side.
Figure 12:
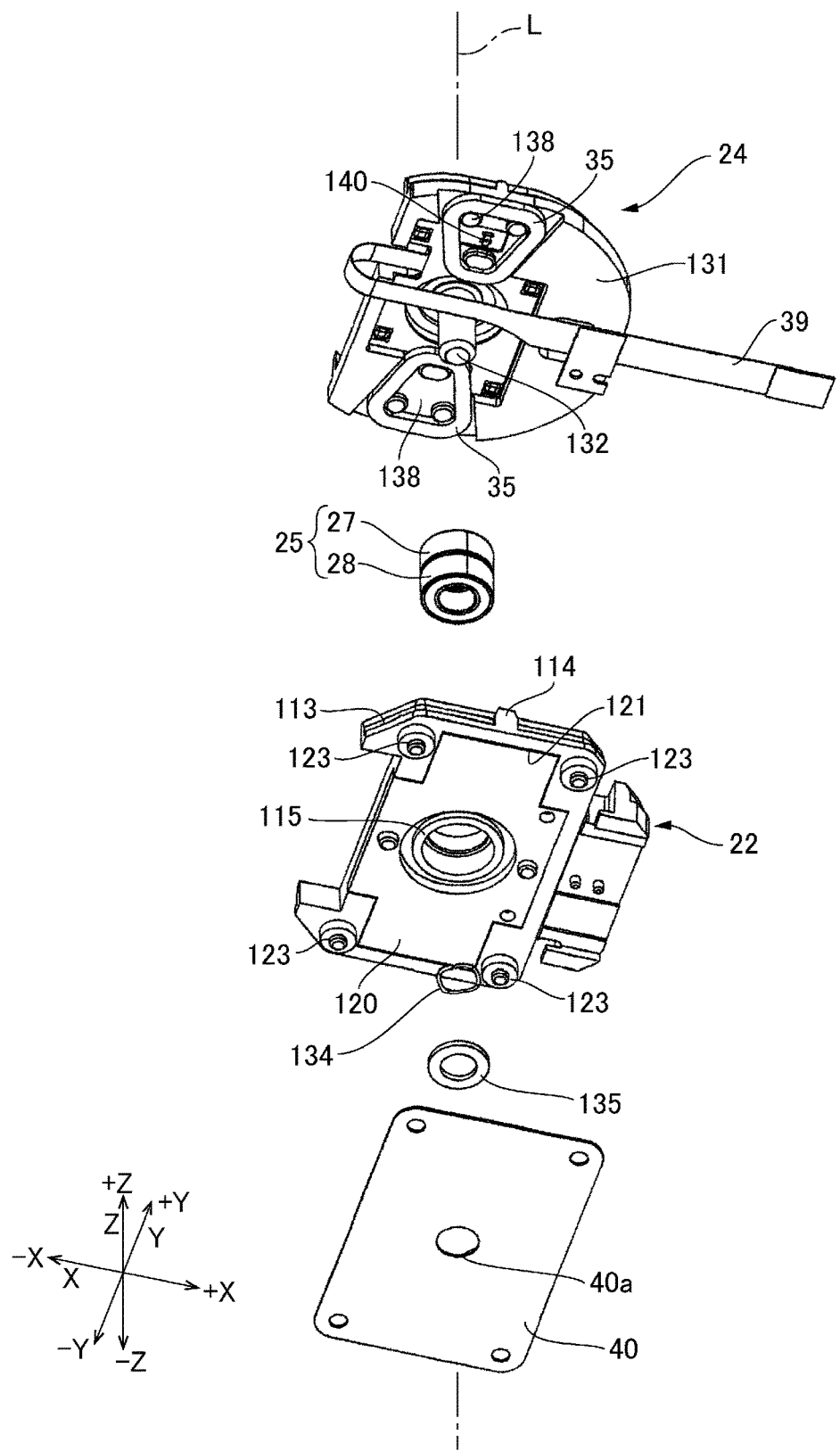
FIG. 12 is an exploded perspective view showing the second unit which is viewed from an anti-object side.
Figure 13:
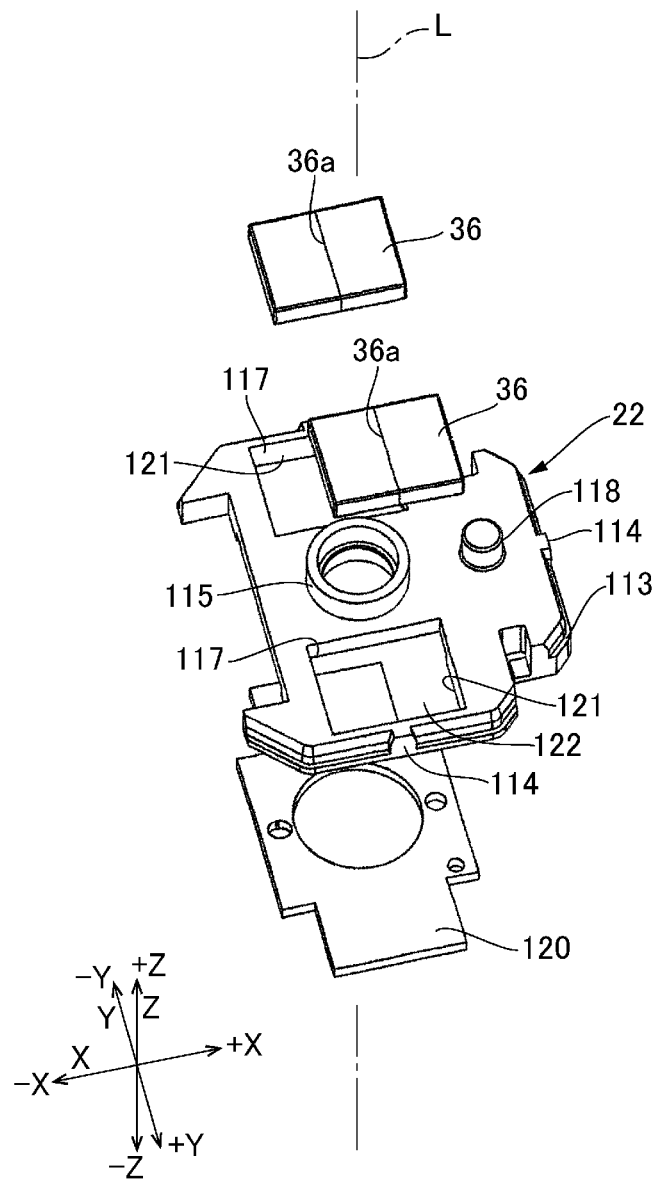
FIG. 13 is an exploded perspective view showing a fixing member viewed from an object side.

FIG. 9A is a perspective views showing the second unit 4 which is viewed from the "+Z" direction side and FIG. 9B is a perspective view showing the second unit 4 which is viewed from the "−Z" direction side. FIG. 10 is a cross-sectional view showing the second unit 4. FIG. 11 is an exploded perspective view showing the second unit 4 which is viewed from the "+Z" direction side (object side). FIG. 12 is an exploded perspective view showing the second unit 4 which is viewed from the "−Z" direction side (anti-object side). FIG. 13 is an exploded perspective view showing the fixing member 22, the rolling drive magnets 36 and a yoke 120. As shown in FIGS. 9A and 9B and FIG. 10, the second unit 4 includes the turnable support mechanism 21 which turnably supports the holder 7 around the axial line "L", the fixing member 22 which supports the holder 7 through the turnable support mechanism 21, a flexible printed circuit board 39 and the cover member 40. The turnable support mechanism 21 includes the turnable pedestal 24 and the bearing mechanism 25 (first ball bearing 27 and second ball bearing 28).

As shown in FIG. 11, the fixing member 22 is formed in a flat shape which is thin in the "Z"-axis direction. The fixing member 22 is provided with a rectangular cut-out part 112 in an end edge portion in the "−X" direction. The fixing member 22 is provided with a step part 113 on an outer peripheral edge portion except the cut-out part 112. The step part 113 is provided with three protruded parts 114 which are respectively protruded to the "+X" direction, the "+Y" direction and the "−Y" direction.

As shown in FIGS. 11 and 12, the fixing member 22 is provided with a tube part 115 which is protruded to the "+Z" direction and the "−Z" direction in a center portion in the "Y"-axis direction. A center hole 116 of the tube part 115 penetrates through the fixing member 22 in the "Z"-axis direction. As shown in FIG. 10, the first ball bearing 27 and the second ball bearing 28 are held on an inner peripheral side of the tube part 115. In other words, the tube part 115 holds an outer ring of the first ball bearing 27 and an outer ring of the second ball bearing 28 from an outer peripheral side.

The fixing member 22 is, as shown in FIG. 11, provided with a pair of rolling drive magnet holding recessed parts 117 on an end face in the "+Z" direction. The pair of the rolling drive magnet holding recessed parts 117 is provided on both sides with the tube part 115 interposed therebetween. The rolling drive magnets 36 are respectively inserted and fixed to the rolling drive magnet holding recessed parts 117. Each of the rolling drive magnets 36 is protected by the fixing member 22 from an outer peripheral side. In this embodiment, the rolling drive magnet 36 is polarized and magnetized in the circumferential direction. A magnetizing polarized line 36a of each of the rolling drive magnets 36 is extended in the radial direction at a center in the circumferential direction of the rolling drive magnet 36. Further, the fixing member 22 is provided with a turning stopper protruded part 118 which is protruded to the "+Z" direction at a position separated from the tube part 115 in the "+X" direction.

In addition, the fixing member 22 is, as shown in FIG. 12, provided with a yoke holding recessed part 121 on an end face in the "−Z" direction. The yoke holding recessed part 121 is provided so as to surround the tube part 115. The yoke holding recessed part 121 is extended in the "Y"-axis direction and, when viewed in the "Z"-axis direction, the yoke holding recessed part 121 is provided with an overlapped portion which is overlapped with a pair of the rolling drive magnet holding recessed parts 117. As shown in FIG. 13, the overlapped portion is a rectangular penetrating part 122 through which the rolling drive magnet holding recessed part 117 and the yoke holding recessed part 121 are communicated with each other in the "Z"-axis direction. The yoke 120 is inserted into the yoke holding recessed part 121 from the "−Z" direction side. The yoke 120 is formed of magnetic material. The yoke 120 is abutted with the rolling drive magnet 36 held by the rolling drive magnet holding recessed part 117 through the penetrating part 122 from the "−Z" direction side.

The fixing member 22 is, as shown in FIG. 12, provided with four cover member fixing protruded parts 123 which are protruded to the "−Z" direction on an outer peripheral side with respect to the yoke holding recessed part 121. Two of the four cover member fixing protruded parts 123 are provided in an end edge portion in the "+Y" direction of the fixing member 22 on both sides with the yoke holding recessed part 121 interposed therebetween in the "X"-axis direction. The other two of the four cover member fixing protruded parts 123 are provided in an end edge portion in the "−Y" direction of the fixing member 22 on both sides with the yoke holding recessed part 121 interposed therebetween in the "X"-axis direction. The cover member 40 is fixed to the four cover member fixing protruded parts 123 from the "−Z" direction side. The cover member 40 covers the yoke 120 from the "−Z" direction side. A circular opening part 40a is provided at a center of the cover member 40. As shown in FIG. 9B, when the cover member 40 is fixed to the fixing member 22, a tip end of a shaft part 132 is inserted into the opening part 40a.

The turnable pedestal 24 includes, as shown in FIG. 12, a pedestal main body 131 in a flat shape which is thin in the "Z"-axis direction, and the shaft part 132 which is protruded from the pedestal main body 131 to the "−Z" direction. As shown in FIG. 10, the shaft part 132 is inserted into the first ball bearing 27 and the second ball bearing 28 which are held by the tube part 115 of the fixing member 22. In other words, the shaft part 132 is held by an inner ring of the first ball bearing 27 and an inner ring of the second ball bearing 28 from an outer peripheral side. The shaft part 132 is penetrated through the first ball bearing 27 and the second ball bearing 28 and its tip end portion is protruded from the second ball bearing 28 to the "−Z" direction. A spring washer 134 is fitted to the tip end portion of the shaft part 132. Further, the tip end portion of the shaft part 132 is fixed with a ring-shaped member 135 by welding or the like. In this embodiment, the spring washer 134 is compressed between the inner ring of the second ball bearing 28 and the ring-shaped member 135 to apply pressurization to the first ball bearing 27 and the second ball bearing 28.

As shown in FIG. 12, a face of the pedestal main body 131 facing the fixing member 22 is provided with a pair of coil fixed parts 138 on both sides with the shaft part 132 interposed therebetween. The rolling drive coils 35 are held by the pair of the coil fixed parts 138 in a posture that its center hole is directed in the "Z"-axis direction. A Hall element 140 is fixed on an inner side of one of the rolling drive coils 35 fixed to the coil fixed parts 138. The Hall element 140 is located at a center of the rolling drive coil 35 in the circumferential direction. The Hall element 140 is electrically connected with the flexible printed circuit board 39 which is electrically connected with the rolling drive coils 35.

As shown in FIG. 11, an end face on the "+Z" direction side of the pedestal main body 131 is provided with a peripheral wall 142 in a substantially U-shape in an outer peripheral edge portion located on an inner side by a constant width from the outer peripheral edge so as to surround the end face from the "+X" direction side and from both sides in the "Y"-axis direction. The peripheral wall 142 is provided with three protruded parts 143 which are respectively protruded to the "+X" direction, the "+Y" direction and the "−Y" direction.

The end face on the "+Z" direction side of the pedestal main body 131 is provided with magnetic member fixed regions 144 for fixing an angular position return magnetic member 37 on both sides in the "Y"-axis direction with the tube part 115 interposed therebetween. The magnetic member fixed region 144 is a groove 145 having a constant width which is extended in parallel to the "X"-axis direction. The angular position return magnetic member 37 is a quadrangular prism shape and its dimension in the circumferential direction ("X"-axis direction) is longer than its dimension in the radial direction. Further, a dimension in the circumferential direction ("X"-axis direction) of the angular position return magnetic member 37 is shorter than a dimension in the circumferential direction ("X"-axis direction) of the groove 145.

The angular position return magnetic member 37 is fixed to an inside of the groove 145 (inside the magnetic member fixed region 144) in a posture that its longitudinal direction is directed in the circumferential direction. A fixed position of the posture return magnetic member 15 is adjusted in an inside of the groove 145 so that, when a state that the turnable pedestal 24 is located at a predetermined reference angular position is viewed in the "Z"-axis direction, a center of the angular position return magnetic member 37 is overlapped with a magnetizing polarized line 36a of the rolling drive magnet 36 and, after that, the angular position return magnetic member 37 is fixed in the inside of the groove 145 with an adhesive.

In this embodiment, the pedestal main body 131 is provided with an opening part 146 at a position different from the magnetic member fixed region 144 in the circumferential direction. In this embodiment, the opening part 146 is provided at a position separated from the shaft part 132 to the "+X" direction.

(Magnetic Rolling Drive Mechanism)

As shown in FIGS. 9A and 9B and FIG. 10, when the turnable pedestal 24 is held by the fixing member 22 through the first ball bearing 27 and the second ball bearing 28, the magnetic rolling drive mechanism 31 is structured. As shown in FIG. 10, the magnetic rolling drive mechanism 31 is structured of a pair of magnetic rolling drive mechanisms 31 which are held on both sides with the shaft part 132 of the turnable pedestal 24 interposed therebetween. Each of the magnetic rolling drive mechanisms 31 includes the rolling drive coil 35 held by the turnable pedestal 24 and the rolling drive magnet 36 which is held by the fixing member 22 and faces the rolling drive coil 35 in the "Z"-axis direction. The rolling drive magnet 36 is divided into two pieces in the circumferential direction and magnetic poles of faces of the rolling drive magnet 36 facing the rolling drive coil 35 are magnetized so as to be different from each other with the magnetizing polarized line 36a as a boundary. The rolling drive coil 35 is an air-core coil whose long side portions extended in the radial direction are utilized as effective sides. When the turnable pedestal 24 is located at a predetermined reference angular position, the Hall element 140 faces the magnetizing polarized line 36a of the swing drive magnet 14 located on the "−Z" direction side.

(Turning Stopper Mechanism)

When the turnable pedestal 24 is held by the fixing member 22 through the first ball bearing 27 and the second ball bearing 28, as shown in FIG. 9A, the turning stopper protruded part 118 of the fixing member 22 is inserted into the opening part 146 of the turnable pedestal 24. As a result, the turning stopper protruded part 118 of the fixing member 22 and the opening part 146 of the turnable pedestal 24 structure a turning stopper mechanism 38 structured to restrict a turnable angular range around the "Z"-axis of the turnable pedestal 24. In other words, the turnable pedestal 24 is turned around the "Z"-axis in a region that the turning stopper protruded part 118 is not interfered with an inner peripheral wall (abutting part) of the opening part 146. In other words, the turning stopper mechanism 38 restricts a turnable angular range of the turnable pedestal 24 by abutting the inner peripheral wall of the opening part 146 with the turning stopper protruded part 118 in the circumferential direction.

(Angular Position Return Mechanism)

Figure 14A:
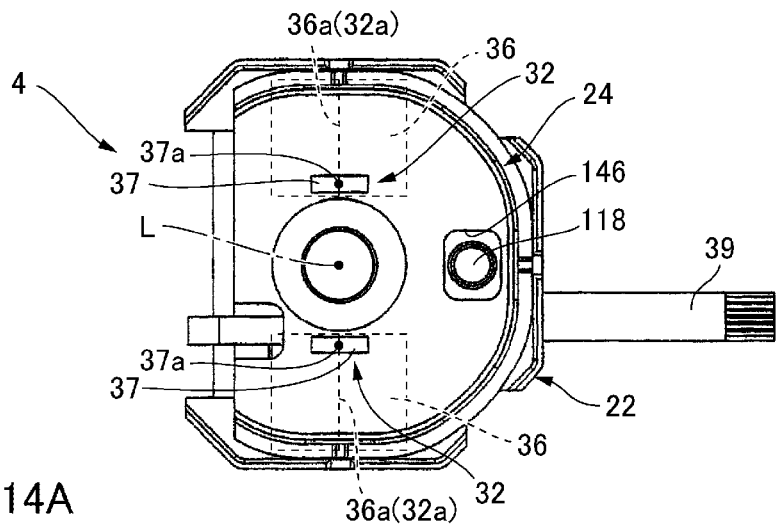
FIGS. 14A, 14B and 14C are explanatory views showing an angular position return mechanism.
Figure 14B:
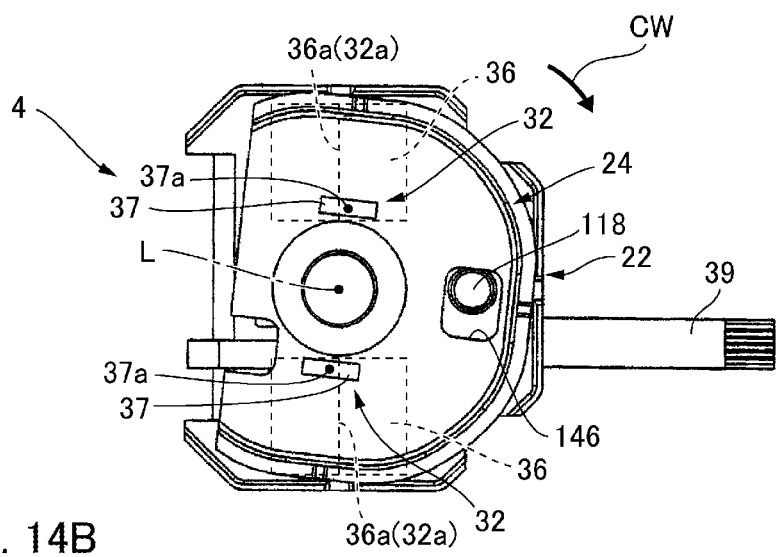
Figure 14C:
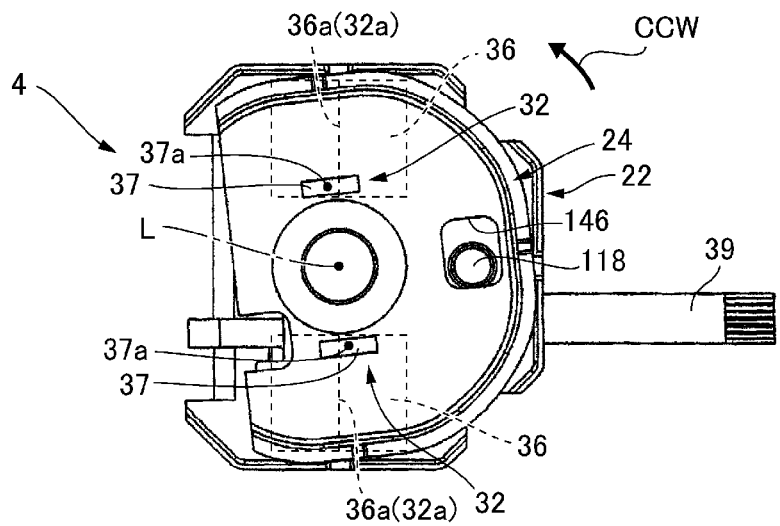

FIGS. 14A, 14B and 14C are explanatory views showing the angular position return mechanism 32. As shown in FIGS. 14A, 14B and 14C, the angular position return mechanism 32 includes the angular position return magnetic members 37 and the rolling drive magnets 36. As shown in FIG. 10, the angular position return magnetic member 37 is disposed on an opposite side to the rolling drive magnet 36 with the rolling drive coil 35 interposed therebetween in the "Z"-axis direction. Further, as shown in FIG. 14A, in a state that the turnable pedestal 24 is turnably supported by the fixing member 22 through the bearing mechanism 25, when a state that the turnable pedestal 24 is located at the reference angular position is viewed in the "Z"-axis direction, the center 37a of the angular position return magnetic member 37 is located at a position overlapping with the magnetizing polarized line 36a of the rolling drive magnet 36 disposed on the "−Z" direction side. In other words, in a state that the turnable pedestal 24 is located at the reference angular position, an imaginary face 32a which is parallel to the axial line "L" including the magnetizing polarized line 36a passes the center 37a of the angular position return magnetic member 37.

Next, as shown in FIGS. 14B and 14C, when the turnable pedestal 24 is turned to the CW direction or to the "CCW" direction from the reference angular position, the center 37a of the angular position return magnetic member 37 is displaced in the circumferential direction from the magnetizing polarized line 36a of the rolling drive magnet 36. As a result, a magnetic attraction force is acted between the angular position return magnetic member 37 and the rolling drive magnet 36 in a direction that the center 37a of the angular position return magnetic member 37 is directed to a side of the magnetizing polarized line 36a of the rolling drive magnet 36. In other words, when the turnable pedestal 24 is turned from the reference angular position, a magnetic attraction force in a direction for returning the turnable pedestal 24 to the reference angular position is acted between the angular position return magnetic member 37 and the rolling drive magnet 36. Therefore, the angular position return magnetic member 37 and the rolling drive magnet 36 function as an angular position return mechanism 32 structured to return the turnable pedestal 24 to the reference angular position.

In the state shown in FIG. 14B, the inner peripheral wall of the opening part 146 of the turnable pedestal 24 is abutted with the turning stopper protruded part 118 of the fixing member 22 from one side in the circumferential direction to restrict further turning of the turnable pedestal 24 to the CW direction. Further, in the state shown in FIG. 14C, the inner peripheral wall of the opening part 146 of the turnable pedestal 24 is abutted with the turning stopper protruded part 118 of the fixing member 22 from the other side in the circumferential direction to restrict further turning of the turnable pedestal 24 to the CCW direction. Therefore, the turnable pedestal 24 is capable of being turned in an angular range from the angular position shown in FIG. 14B to the angular position shown in FIG. 14C.

In this embodiment, as shown in FIGS. 14A through 14C, when the turnable pedestal 24 is turned in the predetermined angular range, the angular position return magnetic member 37 is overlapped with the imaginary face 32a which is extended to the rolling drive coil 35 side so as to include the magnetizing polarized line 36a of the rolling drive magnet 36, and the angular position return magnetic member 37 is not separated from the imaginary face 32a. Therefore, according to the angular position return mechanism 32, a magnetic attraction force can be surely generated in a direction for returning the center 37a of the angular position return magnetic member 37 to the position overlapped with the magnetizing polarized line 36a. Accordingly, the movable unit 5 having been turned can be surely returned to the reference angular position.

(Attaching First Unit to Second Unit)

In this embodiment, when the first unit 3 is to be attached to the second unit 4, the peripheral wall 142 of the second unit 4 is inserted into the lower end portion of the holder body part 63 of the holder 7, and the protruded parts 143 protruded from the peripheral wall 142 of the second unit 4 are inserted to the positioning cut-out parts 67 provided in the holder body part 63. Therefore, the holder 7 is fixed to the turnable pedestal 24 in a state positioned in the radial direction and the circumferential direction. Further, when the first unit 3 is to be attached to the second unit 4, a portion on the "+Z" direction side of the step part 113 on an outer peripheral edge of the fixing member 22 is inserted to the lower end portion of the tube-shaped case 45, and the protruded part 114 provided in the step part 113 is inserted into the positioning cut-out part 56 provided in the tube-shaped case 45. Therefore, the case body 8 is fixed to the fixing member 22 in a state positioned in the radial direction and the circumferential direction to structure the fixed body 42. As a result, the optical unit 1 is completed.

(Shake Correction of Optical Unit)

The optical unit 1 includes, as described above, the magnetic swing drive mechanism 11 structured so that the first unit 3 performs a shake correction around the "X"-axis and a shake correction around the "Y"-axis. Therefore, shake corrections in the pitching (vertical swing) direction and the yawing (lateral swing) direction can be performed. Further, in the optical unit 1, the second unit 4 includes the magnetic rolling drive mechanism 31 structured to turn the holder 7 of the first unit 3 and thus a shake correction in the rolling direction can be performed. In this embodiment, the optical unit 1 includes a gyroscope in the movable unit 5 and thus shakes around three axes perpendicular to each other are detected by the gyroscope and the magnetic swing drive mechanism 11 and the magnetic rolling drive mechanism 31 are driven so as to cancel the detected shake.

In accordance with an embodiment of the present invention, a shake correction of the optical unit 1 may be performed based on an output of the Hall element 90 and an output of the Hall element 140.

In other words, the Hall element 90 faces the magnetizing polarized line 14a of the swing drive magnet 14 when the movable unit 5 is in the reference posture and thus, based on an output of the Hall element 90, it can be detected that the movable unit 5 is set in the reference posture and a tilt angle that the movable unit 5 is tilted with respect to the axial line "Z". Therefore, when the magnetic swing drive mechanism 11 is driven so that a tilt of the movable unit 5 is canceled to set to be the reference posture based on an output of the Hall element 90, shake corrections around the "X"-axis and around the "Y"-axis of the optical unit 1 can be performed. Further, the Hall element 140 faces the magnetizing polarized line 36a of the rolling drive magnet 36 in the "Z"-axis direction when the turnable pedestal 24 (movable body 41) is located at the reference angular position. Therefore, based on an output of the Hall element 140, it can be detected that the turnable pedestal 24 (movable body 41) is located at the reference angular position and, in addition, a turning angle from the reference angular position of the turnable pedestal 24 (movable body 41) can be detected. Therefore, when the magnetic rolling drive mechanism 31 is driven so that turning of the turnable pedestal 24 (movable body 41) is canceled to return to the reference angular position based on an output of the Hall element 140, a shake correction around the "Z"-axis of the optical unit 1 can be performed.

Further, a shake correction of the optical unit 1 may be performed based on shakes around three axes detected by a gyroscope, an output of the Hall element 90, and an output of the Hall element 140. In this case, shakes around three axes are detected by the gyroscope and the magnetic swing drive mechanism 11 and the magnetic rolling drive mechanism 31 are driven so as to cancel the detected shake. In addition, when the movable unit 5 is to be returned to the reference posture, the magnetic swing drive mechanism 11 is driven based on an output of the Hall element 90 to accurately set the movable unit 5 in the reference posture. Further, when the turnable pedestal 24 (movable body 41) is to be returned to the reference angular position, the magnetic rolling drive mechanism 31 is driven based on an output of the Hall element 140 to accurately set the turnable pedestal 24 (movable body 41) at the reference angular position.

(Gravity Center Adjusting Method for Movable Unit)

Figure 15:
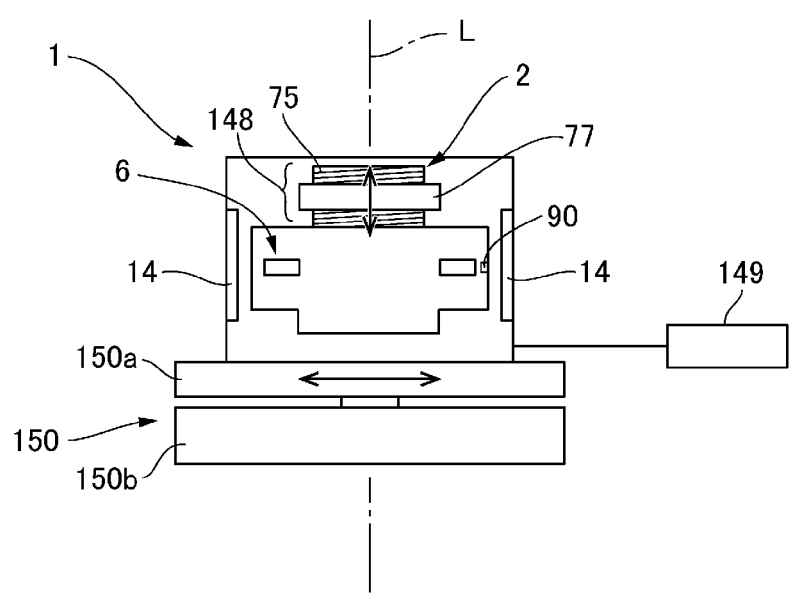
FIG. 15 is an explanatory view showing a gravity center adjusting method for a movable unit.
Figure 16:
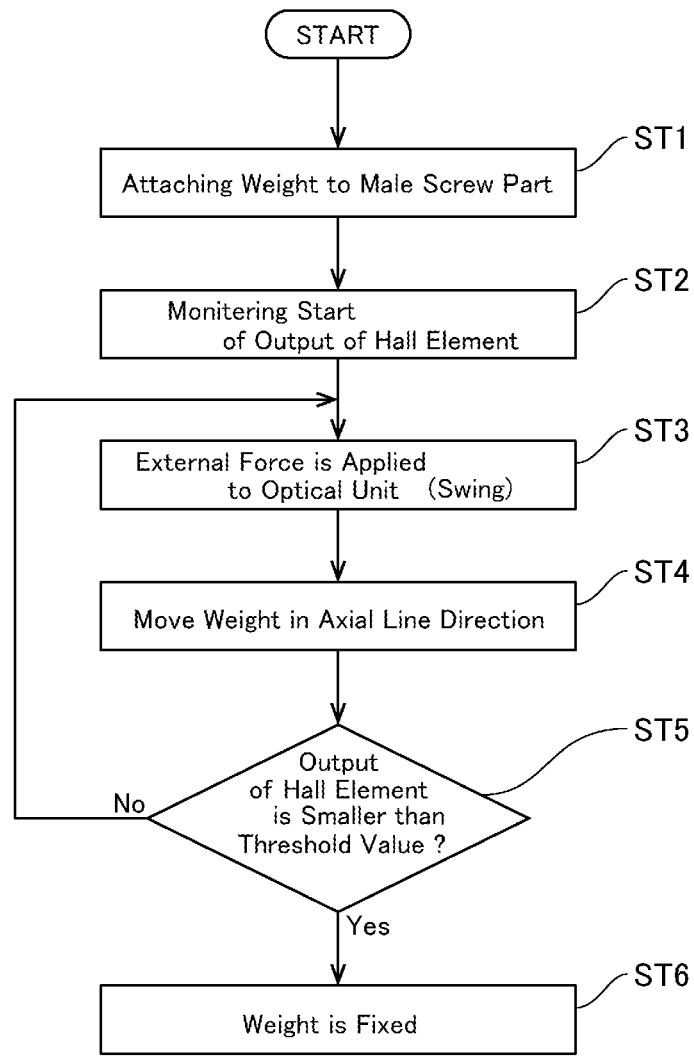
FIG. 16 is a flow chart showing a gravity center adjusting method for the movable unit.

FIG. 15 is an explanatory view showing a gravity center adjusting method for the movable unit 5 (swing body). FIG. 16 is a flow chart showing a gravity center adjusting method for the movable unit 5. As shown in FIG. 15, in this embodiment, a device for adjusting a gravity center of the movable unit 5 includes a vibration generator 150 structured to swing the movable unit 5 in a direction perpendicular to the axial line "L", and a detecting part 149 which detects an output of the Hall element 90 through the flexible printed circuit board 18. The vibration generator 150 includes a pedestal part 150a to which the optical unit 1 is fixed and a drive part 150b which swings the pedestal part.

As shown in FIG. 16, when a gravity center of the movable unit 5 is to be adjusted, first, the weight 77 is attached to the male screw part 75 (fixed region) of the movable unit 5 (optical module 2) and the optical unit 1 is fixed to the pedestal part 150a of the vibration generator 150 (step "ST1"). The optical unit 1 is fixed to the pedestal part 150a so that the axial line "L" is perpendicular to a swing direction of the pedestal part 150a. After that, electrical power is supplied to the Hall element 90 and an output of the Hall element 90 is monitored by the detecting part 149 (step "ST2"). Next, a swing operation (step "ST3") in which the vibration generator 150 is driven to swing the pedestal part 150a and a moving operation (step "ST4") in which the weight 77 is turned around the axial line "L" to move the weight 77 along the male screw part 75 are alternately repeated. The swing operation is an external force applying operation in which an external force is applied to the optical unit 1 in a direction perpendicular to the axial line "L". Next, a point is detected when an output of the Hall element 90 becomes smaller than a predetermined threshold value (step "ST5"), and the weight 77 is fixed to the position of the point (step "ST6").

In a state that a swing center by the swing support mechanism 6 and a gravity center of the movable unit 5 are coincided with each other, a swing of the movable unit 5 is restrained when an external force is applied. Therefore, in a state that a swing center by the swing support mechanism 6 and a gravity center of the movable unit 5 are coincided with each other, an output (amplitude of voltage signal) of the Hall element 90 becomes small. Accordingly, in a case that an external force is applied while changing a position of the weight 77, when the weight 77 is fixed at a position where an output of the Hall element 90 becomes smallest (position where the output becomes smaller than a predetermined threshold value), the swing center by the swing support mechanism 6 and the gravity center of the movable unit 5 can be coincided with each other.

According to this embodiment, a gravity center of the movable unit 5 can be adjusted by utilizing an output of the Hall element 90 provided in the swing support mechanism 6. Therefore, a device for adjusting a gravity center of the movable unit 5 can be simply structured.

Operations and Effects

In this embodiment, a fixed position of the weight 77 to be attached to the movable unit 5 can be changed in the axial line "L" direction along the male screw part 75 (within a fixed region) provided in the movable unit 5. Therefore, when one weight 77 is to be attached to the optical module 2, a gravity center of the movable unit 5 can be adjusted in the optical axis direction by adjusting a fixed position of the weight 77 in the male screw part 75 in the optical axis direction.

Further, in this embodiment, the female screw part 77a of the weight 77 and the male screw part 75 of the lens barrel part 72 of the movable unit 5 are threadedly engaged with each other and, when the weight 77 is turned, the weight 77 can be moved in the optical axis direction. Therefore, the gravity center is easily adjusted. Further, the position of the weight 77 in the optical axis direction can be finely adjusted by turning the weight 77 around the optical axis.

Modified Embodiments

In accordance with an embodiment of the present invention, the weight 77 may be provided with an engaging part 77b (see the broken line portion in FIG. 6) which is capable of engaging with a jig for turning the weight 77. For example, a recessed part or a protruded part may be provided as an engaging part 77b on an end face of the weight 77 which is capable of being observed from the "+Z" direction when the weight 77 is attached to the optical module 2. Alternatively, a recessed part or a protruded part may be provided on an outer peripheral face of the weight 77 which faces an outer side in the radial direction. According to this structure, a jig can be engaged with an engaging part formed of a recessed part or a protruded part from the "+Z" direction to turn the weight 77 around the axial line "L". Therefore, the position of the weight 77 is moved in the axial line "L" direction and thereby the gravity center of the movable unit 5 is easily adjusted.

Figure 17A:
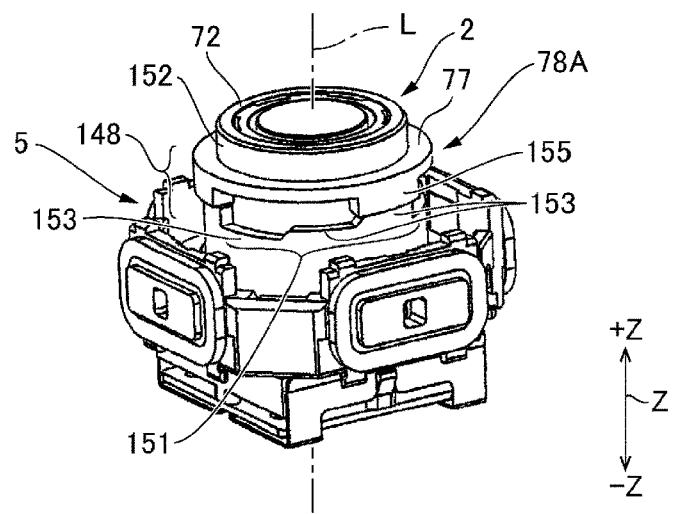
FIGS. 17A, 17B and 17C are explanatory views showing a position adjusting mechanism in a first modified embodiment.
Figure 17B:
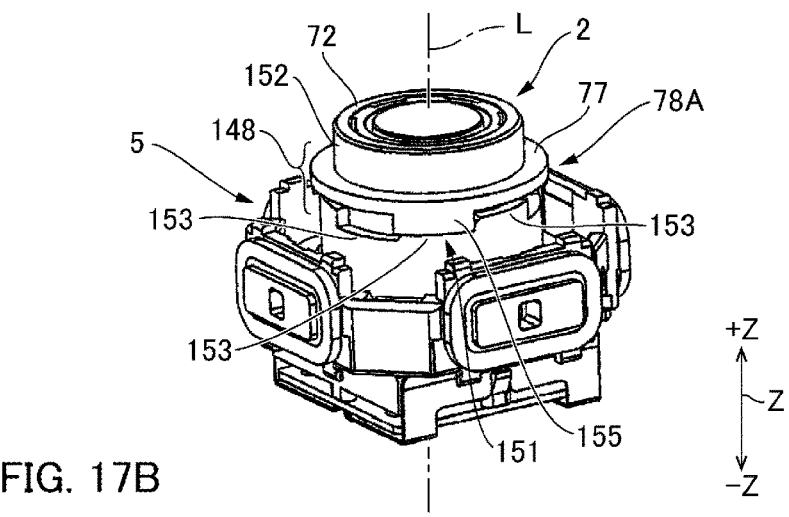
Figure 17C:
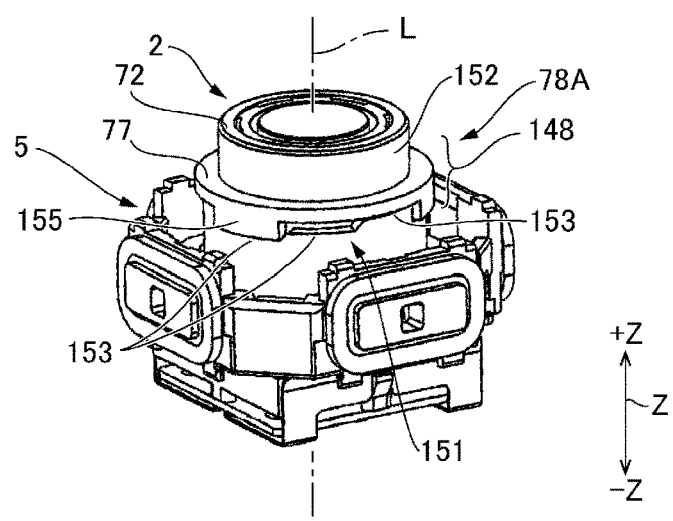
Figure 18:
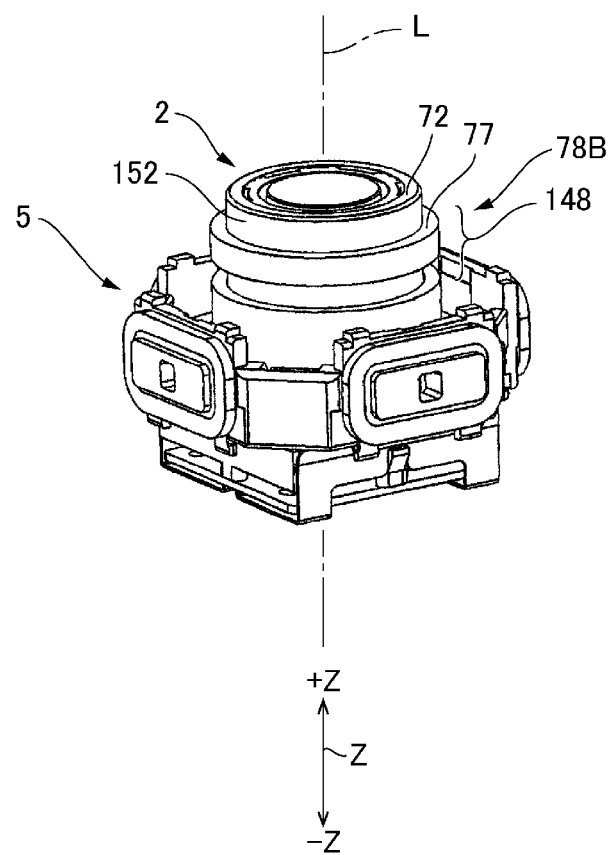
FIG. 18 is an explanatory view showing a position adjusting mechanism in a second modified embodiment.

In accordance with an embodiment of the present invention, another structure different from the above-mentioned position adjusting mechanism 78 may be adopted as the position adjusting mechanism by which the position of the weight 77 is moved in the "Z"-axis direction in the fixed region. FIGS. 17A, 17B and 17C are explanatory views showing a position adjusting mechanism in accordance with a first modified embodiment. In FIG. 17A, a weight 77 is located on the "+Z" direction side in a fixed region, in FIG. 17B, the weight 77 is located at a center in the "Z"-axis direction in the fixed region and, in FIG. 17C, the weight 77 is located on the "−Z" direction side in the fixed region. FIG. 18 is an explanatory view showing a position adjusting mechanism in accordance with a second modified embodiment. Even in cases that the position adjusting mechanisms in the first and second modified embodiments are adopted, other portions except the position adjusting mechanism are similar to the above-mentioned optical unit 1. Therefore, in descriptions of the position adjusting mechanisms of the first and the second modified embodiments, only a movable unit 5 and a weight 77 are described and other descriptions are omitted.

As shown in FIGS. 17A, 17B and 17C, a position adjusting mechanism 78A in the first modified embodiment includes three sets of stepped protruded parts 151 provided on an outer peripheral face 152 (fixed region 148) of the lens barrel part 72. Three sets of the stepped protruded parts 151 are provided around the "Z"-axis with angular intervals of 120 degrees. The respective stepped protruded parts 151 are formed so that three protruded parts 153 provided at positions different in the circumferential direction and the axial line "L" direction on an outer peripheral face 152 (fixed region 148) of the lens barrel part 72 are connected with each other in the circumferential direction. Further, the position adjusting mechanism 78A includes three protruded parts 155 (abutting part) which are protruded from an end edge on the "−Z" direction side of a ring-shaped weight 77 to the "−Z" direction. The three protruded parts 155 are provided around the "Z"-axis rotation with angular intervals of 120 degrees. The lens barrel part 72 is inserted into a center hole of the weight 77. The respective protruded parts 155 can be respectively abutted with the protruded parts 153 having the same height of the respective stepped protruded parts 151 from the "+Z" direction side.

When a fixed position of the weight 77 is to be moved in a fixed region 148, as shown in FIGS. 17A, 17B and 17C, the weight 77 is turned in a state that the lens barrel part 72 is inserted into a center hole of the weight 77. The respective protruded parts 155 of the weight 77 are selectively abutted with three protruded parts 153 having the same height of three sets of the stepped protruded parts 151. In this embodiment, when the protruded parts 153 abutted with the protruded parts 155 of the weight 77 are changed, the weight 77 is moved by a specified amount in the "Z"-axis direction and thus the gravity center is easily adjusted.

In a position adjusting mechanism 78B in the second modified embodiment, as shown in FIG. 18, a fixed region 148 whose outer diameter dimension is constant in the "Z"-axis direction is provided over a region with a constant width in the "Z"-axis direction on an outer peripheral face 152 of the lens barrel part 72. The weight 77 is formed in a ring shape and its inner diameter dimension is substantially the same as the outer diameter dimension of the fixed region 148 (outer diameter dimension of the lens barrel part 72). The lens barrel part 72 is press-fitted to a center hole of the weight 77. When a fixed position of the weight 77 is to be moved in the fixed region 148, the weight 77 attached to the outer peripheral face 152 of the lens barrel part 72 is pressed by a jig or the like to move the weight 77 in the "Z"-axis direction. Also in this method, the fixed position of the weight 77 can be moved in the fixed region 148 in the "Z"-axis direction.

(Another Embodiment of Gravity Center Adjusting Method for Movable Unit)

Figure 19:
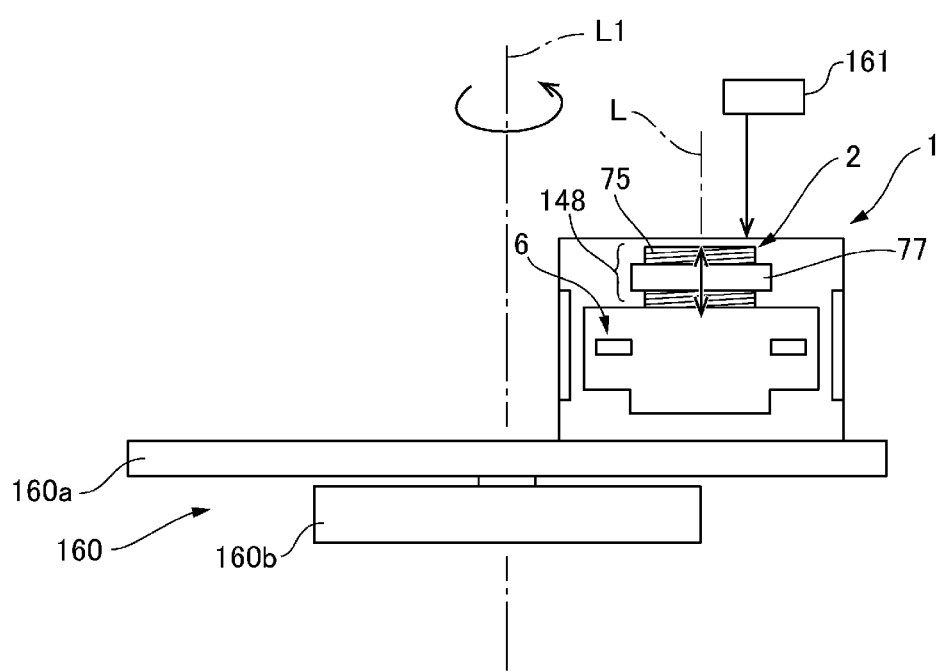
FIG. 19 is an explanatory view showing a gravity center adjusting method for a movable unit in another embodiment.
Figure 20:
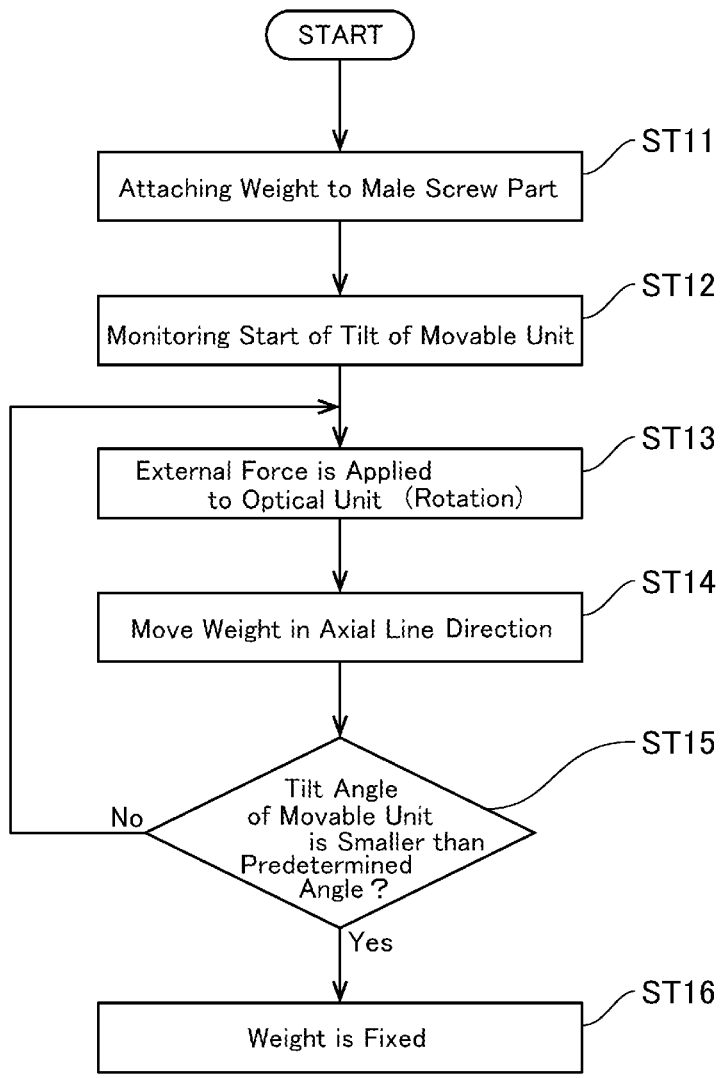
FIG. 20 is a flow chart showing a gravity center adjusting method for a movable unit in another embodiment.

Instead of monitoring an output of the Hall element 90, it may be structured that a gravity center position of the movable unit 5 is adjusted by monitoring a tilt of the movable unit 5 by using a measuring apparatus. FIG. 19 is an explanatory view showing a gravity center adjusting method in a case that a tilt of the movable unit 5 is monitored. FIG. 20 is a flow chart showing a gravity center adjusting method in a case that a tilt of the movable unit 5 is monitored. For example, a laser displacement meter may be used as a measuring apparatus 161 for monitoring a tilt of the movable unit 5. Further, in this embodiment, as a device for adjusting a gravity center of the movable unit 5, a centrifugal force generator 160 may be used which includes a pedestal part 160*a* and a drive part 160*b* which rotates the pedestal part 160*a* around a predetermined rotation axis "L1". As shown in FIG. 19, the measuring apparatus 161 is installed at a position where a measurement light (laser beam) parallel to the rotation axis "L1" is capable of irradiating to the movable unit 5 of the optical unit 1 which is fixed to the pedestal part 160*a*.

As shown in FIG. 20, when a gravity center of the movable unit 5 is to be adjusted, first, a weight 77 is attached to the male screw part 75 of the movable unit 5 (optical module 2) and the optical unit 1 is fixed to the pedestal part 160*a* of the centrifugal force generator 160 (step "ST11"). The optical unit 1 is fixed to the pedestal part 160*a* so that the axial line "L" is parallel to an axial line of the pedestal part 160*a*. After that, a measurement light is irradiated from the measuring apparatus 161 and an angle with respect to the axial line "L" of the movable unit 5 is monitored (step "ST12") and, in addition, a rotating operation (step "ST13") in which a centrifugal force generator 160 is driven to rotate the pedestal part 160*a*, and a moving operation (step "ST14") in which the weight 77 is turned around the axial line "L" so that the weight 77 is moved in a region of the male screw part 75, are alternately repeated. The rotating operation is an external force applying operation in which an external force in a direction perpendicular to the axial line "L" is applied to the optical unit 1. Next, a point where a tilt angle of the movable unit 5 with respect to the axial line "L" becomes smaller than a predetermined angle is detected (step "ST15") and the weight 77 is fixed to the position of the point (step "ST16").

In a state that a swing center by the swing support mechanism 6 (swing axis) and a gravity center of the movable unit 5 are coincided with each other, a swing of the movable unit 5 is restrained when an external force is applied. Therefore, in a case that an external force is applied while the position of the weight 77 is changed, when the weight 77 is fixed at a position where a tilt of the movable unit 5 becomes smallest (position where a tilt angle becomes smaller than a predetermined angle), a swing center by the swing support mechanism 6 and a gravity center of the movable unit 5 are substantially coincided with each other.

In accordance with an embodiment of the present invention, a swing generator 150 may be used also in a gravity center adjusting method in which the weight 77 is moved while detecting a tilt of the movable unit 5 by the measuring apparatus 161. Further, a centrifugal force generator 160 may be used, instead of the vibration generator 150, also in a gravity center adjusting method in which the weight 77 is moved while detecting an output of the Hall element 90.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function, the optical unit comprising:
  a swing body which holds an optical element;
  a swing support mechanism structured to swingably support the swing body between a reference posture, where an axial line previously set and an optical axis are coincided with each other, and a tilted posture, where the optical axis is tilted with respect to the axial line;
  a support body which supports the swing body through the swing support mechanism; and
  a weight which is used so that a swing center of the swing body and a gravity center of the swing body are coincided with each other in a direction of the axial line;
  wherein the swing body comprises a fixed region to which the weight is fixed; and
  wherein a fixed position of the weight is changeable in the fixed region in a direction of the optical axis.

2. The optical unit with a shake correction function according to claim 1, further comprising a position adjusting mechanism structured to move the fixed position in the fixed region,
  wherein the swing body comprises a tube part which is coaxial with an optical axis of the optical element,
  wherein the fixed region is an outer peripheral face portion of the tube part which faces an outer side in a radial direction,
  wherein the weight is formed in a ring shape and the tube part is inserted into a center hole of the weight, and
  wherein the position adjusting mechanism comprises a female screw part provided on an inner peripheral face of the weight and a male screw part which is provided in the fixed region and is threadedly engaged with the female screw.

3. The optical unit with a shake correction function according to claim 2, wherein the weight comprises an engaging part structured to engage with a jig on a portion which is visually observed when viewed in the direction of the axial line.

4. The optical unit with a shake correction function according to claim 2, wherein
  the swing body comprises a lens barrel part which holds the optical element on an inner peripheral side of the swing body, and
  the tube part is a part of the lens barrel part.

5. The optical unit with a shake correction function according to claim 4, wherein
  the swing body comprises an optical module having the lens barrel part and a lens barrel holder which holds the optical module from an outer peripheral side,
  the optical module holds a circuit board on which an imaging element is mounted at an end part on an image side of the lens barrel part,
  the lens barrel holder comprises an optical module holding part in a tube shape which holds the optical module from an outer peripheral side,
  an end part of the lens barrel part on an object side is protruded to the object side from the optical module holding part, and
  the male screw part is formed on an outer peripheral face of the lens barrel part which is protruded to the object side from the lens barrel holder.

6. The optical unit with a shake correction function according to claim 5, further comprising:
  a magnetic swing drive mechanism structured to swing the swing body; and
  a fixed body which supports the swing body through the support body,
  wherein the lens barrel holder comprises:
    a bottom plate part which is provided with the optical module holding part at a center of the bottom plate part; and a plurality of wall parts which are formed so as to stand up in the direction of the optical axis from an outer peripheral side of the bottom plate part, wherein the fixed body comprises a case in a tube shape provided with a plurality of side plates facing the plurality of the wall parts from an outer peripheral side, and wherein the magnetic swing drive mechanism is structured between the plurality of the wall parts of the lens barrel holder and the plurality of the side plates of the case.

7. The optical unit with a shake correction function according to claim 2, wherein the swing body comprises a lens barrel part which holds the optical element on an inner peripheral side of the lens barrel part and a lens barrel holder having a holding part in a tube shape which holds the lens barrel part from an outer peripheral side, and the tube part is a part of the holding part.

8. The optical unit with a shake correction function according to claim 1, further comprising a position adjusting mechanism structured to move the fixed position in the fixed region, wherein the swing body comprises a tube part which is coaxial with an optical axis of the optical element, wherein the fixed region is an outer peripheral face portion of the tube part which faces an outer side in a radial direction, wherein the weight is formed in a ring shape and the tube part is inserted into a center hole of the weight, wherein the position adjusting mechanism comprises:

a plurality of protruded parts provided in the fixed region at positions different in a circumferential direction and in a direction of the axial line; and an abutting part which is protruded from the weight in the direction of the axial line so as to abut with each of the plurality of the protruded parts in the direction of the axial line, wherein the weight is turned around the axial line to change the protruded part abutted with the abutting part and thereby a fixed position of the weight is moved in the direction of the axial line.

9. The optical unit with a shake correction function according to claim 8, wherein the weight comprises an engaging part structured to engage with a jig on a portion which is visually observed when viewed in the direction of the axial line.

10. The optical unit with a shake correction function according to claim 8, wherein the swing body comprises a lens barrel part which holds the optical element on an inner peripheral side of the swing body, and the tube part is a part of the lens barrel part.

11. The optical unit with a shake correction function according to claim 8, wherein the swing body comprises a lens barrel part which holds the optical element on an inner peripheral side of the lens barrel part and a lens barrel holder having a holding part in a tube shape which holds the lens barrel part from an outer peripheral side, and the tube part is a part of the holding part.

12. The optical unit with a shake correction function according to claim 1, further comprising:

a magnetic swing drive mechanism structured to swing the swing body; and a fixed body which supports the swing body through the support body, wherein the magnetic swing drive mechanism comprises a coil fixed to one of the swing body and the fixed body and a magnet fixed to the other of the swing body and the fixed body so as to face the coil in a radial direction, and wherein the magnet is polarized and magnetized in two pieces in the direction of the axial line.

13. The optical unit with a shake correction function according to claim 12, wherein the magnetic swing drive mechanism comprises a Hall element which is attached to the one of the swing body and the support body where the coil is fixed so as to face the magnet.

14. The optical unit with a shake correction function according to claim 12, further comprising a position adjusting mechanism structured to move the fixed position in the fixed region, wherein the swing body comprises a tube part which is coaxial with an optical axis of the optical element, wherein the fixed region is an outer peripheral face portion of the tube part which faces an outer side in a radial direction, wherein the weight is formed in a ring shape and the tube part is inserted into a center hole of the weight, and wherein the position adjusting mechanism comprises a female screw part provided on an inner peripheral face of the weight and a male screw part which is provided in the fixed region and is threadedly engaged with the female screw.

15. The optical unit with a shake correction function according to claim 14, wherein the swing body comprises a lens barrel part which holds the optical element on an inner peripheral side of the swing body, and the tube part is a part of the lens barrel part.

16. The optical unit with a shake correction function according to claim 15, wherein the swing body comprises an optical module having the lens barrel part and a lens barrel holder which holds the optical module from an outer peripheral side, the optical module holds a circuit board on which an imaging element is mounted at an end part on an image side of the lens barrel part, the lens barrel holder comprises an optical module holding part in a tube shape which holds the optical module from an outer peripheral side, an end part of the lens barrel part on an object side is protruded to the object side from the optical module holding part, and the male screw part is formed on an outer peripheral face of the lens barrel part which is protruded to the object side from the lens barrel holder.

17. The optical unit with a shake correction function according to claim 14, wherein the swing body comprises a lens barrel part which holds the optical element on an inner peripheral side of the lens barrel part and a lens barrel holder having a holding part in a tube shape which holds the lens barrel part from an outer peripheral side, and the tube part is a part of the holding part.

18. The optical unit with a shake correction function according to claim 12, further comprising a position adjusting mechanism structured to move the fixed position in the fixed region, wherein the swing body comprises a tube part which is coaxial with an optical axis of the optical element, wherein the fixed region is an outer peripheral face portion of the tube part which faces an outer side in a radial direction, wherein the weight is formed in a ring shape and the tube part is inserted into a center hole of the weight, wherein the position adjusting mechanism comprises:
  a plurality of protruded parts provided in the fixed region at positions different in a circumferential direction and in a direction of the axial line; and
  an abutting part which is protruded from the weight in the direction of the axial line so as to abut with each of the plurality of the protruded parts in the direction of the axial line, wherein the weight is turned around the axial line to change the protruded part abutted with the abutting part and thereby a fixed position of the weight is moved in the direction of the axial line.

19. The optical unit with a shake correction function according to claim 18, wherein
  the swing body comprises a lens barrel part which holds the optical element on an inner peripheral side of the swing body, and
  the tube part is a part of the lens barrel part.

20. The optical unit with a shake correction function according to claim 18, wherein
  the swing body comprises a lens barrel part which holds the optical element on an inner peripheral side of the lens barrel part and a lens barrel holder having a holding part in a tube shape which holds the lens barrel part from an outer peripheral side, and
  the tube part is a part of the holding part.

21. A gravity center adjusting method for the swing body in the optical unit with a shake correction function defined in claim 12, the gravity center adjusting method comprising:
  previously providing a gimbal mechanism as the swing support mechanism;
  previously attaching a Hall element to the one of the swing body and the fixed body where the coil is fixed at a position facing a magnetizing polarized line of the magnet when the swing body is set in the reference posture;
  attaching the weight in the fixed region;
  while monitoring an output of the Hall element, an external force applying operation in which an external force in a direction perpendicular to the axial line is applied to the optical unit and a moving operation in which the weight is moved in the fixed region are alternately repeated; and
  fixing the weight at a position where the output of the Hall element becomes smaller than a predetermined threshold value.

22. The gravity center adjusting method according to claim 21, wherein
  the optical unit comprises a position adjusting mechanism structured to move the fixed position in the fixed region,
  the swing body comprises a tube part which is coaxial with an optical axis of the optical element,
  the fixed region is an outer peripheral face portion of the tube part which faces an outer side in a radial direction,
  the weight is formed in a ring shape and the tube part is inserted into a center hole of the weight, and
  the position adjusting mechanism comprises a female screw part provided on an inner peripheral face of the weight and a male screw part which is provided in the fixed region and is threadedly engaged with the female screw.

23. The gravity center adjusting method according to claim 21, wherein
  the optical unit comprises a position adjusting mechanism structured to move the fixed position in the fixed region,
  the swing body comprises a tube part which is coaxial with an optical axis of the optical element,
  the fixed region is an outer peripheral face portion of the tube part which faces an outer side in a radial direction,
  the weight is formed in a ring shape and the tube part is inserted into a center hole of the weight,
  the position adjusting mechanism comprises:
    a plurality of protruded parts provided in the fixed region at positions different in a circumferential direction and in a direction of the axial line; and
    an abutting part which is protruded from the weight in the direction of the axial line so as to abut with each of the plurality of the protruded parts in the direction of the axial line,
  the weight is turned around the axial line to change the protruded part abutted with the abutting part and thereby a fixed position of the weight is moved in the direction of the axial line.

24. A gravity center adjusting method for the swing body in the optical unit with a shake correction function defined in claim 12, the gravity center adjusting method comprising:
  previously providing a gimbal mechanism as the swing support mechanism;
  attaching the weight in the fixed region;
  while monitoring a tilt angle of the swing body with respect to the axial line, an external force applying operation in which an external force in a direction perpendicular to the axial line is applied to the optical unit and a moving operation in which the weight is moved in the fixed region are alternately repeated; and
  fixing the weight at a position where the tilt angle with respect to the axial line becomes smaller than a predetermined angle.

25. The gravity center adjusting method according to claim 24, wherein
  the optical unit comprises a position adjusting mechanism structured to move the fixed position in the fixed region,
  the swing body comprises a tube part which is coaxial with an optical axis of the optical element,
  the fixed region is an outer peripheral face portion of the tube part which faces an outer side in a radial direction,
  the weight is formed in a ring shape and the tube part is inserted into a center hole of the weight, and
  the position adjusting mechanism comprises a female screw part provided on an inner peripheral face of the weight and a male screw part which is provided in the fixed region and is threadedly engaged with the female screw.

26. The gravity center adjusting method according to claim 24, wherein
  the optical unit comprises a position adjusting mechanism structured to move the fixed position in the fixed region,
  the swing body comprises a tube part which is coaxial with an optical axis of the optical element,
  the fixed region is an outer peripheral face portion of the tube part which faces an outer side in a radial direction,
  the weight is formed in a ring shape and the tube part is inserted into a center hole of the weight, the position adjusting mechanism comprises:
  a plurality of protruded parts provided in the fixed region at positions different in a circumferential direction and in a direction of the axial line; and
  an abutting part which is protruded from the weight in the direction of the axial line so as to abut with each of the plurality of the protruded parts in the direction of the axial line,
the weight is turned around the axial line to change the protruded part abutted with the abutting part and thereby a fixed position of the weight is moved in the direction of the axial line.

\* \* \* \* \*